United States Patent [19]
Dempster

[11] Patent Number: 5,538,431
[45] Date of Patent: Jul. 23, 1996

[54] TYPING & MOUSE MANIPULATION TECHNIQUE AND INSTRUCTION METHOD

[76] Inventor: Gregory Dempster, 473 Cypress Dr., Laguna Beach, Calif. 92651

[21] Appl. No.: 410,075

[22] Filed: Mar. 24, 1995

[51] Int. Cl.$^6$ .......................... G09B 13/00; G09B 19/00
[52] U.S. Cl. .......................................... 434/227; 434/118
[58] Field of Search ................................. 434/227, 231, 434/219, 118

[56] References Cited

U.S. PATENT DOCUMENTS

| | | | |
|---|---|---|---|
| 1,277,169 | 8/1918 | Anderson | 434/227 |
| 2,427,694 | 9/1947 | Sieurin | 434/227 |
| 4,580,984 | 4/1986 | Madaus | 434/227 |
| 5,096,317 | 3/1992 | Phillippe | 434/227 |
| 5,269,689 | 12/1993 | Hill | 434/227 |

FOREIGN PATENT DOCUMENTS

| 377561 | 6/1964 | Switzerland | 434/227 |
|---|---|---|---|

*Primary Examiner*—Paul J. Hirsch
*Attorney, Agent, or Firm*—John J. Connors; Connors & Associates

[57] ABSTRACT

A method of typing to reduce repetitive strain injuries comprises coordinating the movement of all moving parts from the shoulders to the fingers to avoid dissonant movement of any one part, starting with the hand and forearm in a natural profile. Each separately moving part is limited to movement to within its mid-range of motion. For speed, a finger is lifted and the hand is rotated to amplify the elevation. Conversely, lowering of the finger to strike a key involves rotating the hand in a reverse direction. The fingers are simply dropped, aiming at the top of the key to eliminate wasteful downward force and reduce finger-to-keyboard impact. Major movement of the fingers about the keyboard occurs simultaneously with upper and lower arm motion to eliminate stressful finger motions. A mouse manipulation method also employ the hand in a natural profile. An instruction methods for both the typing and mouse manipulation techniques teaches the student staring from the natural profile and moving in the mid-range of joint articulation.

20 Claims, 23 Drawing Sheets

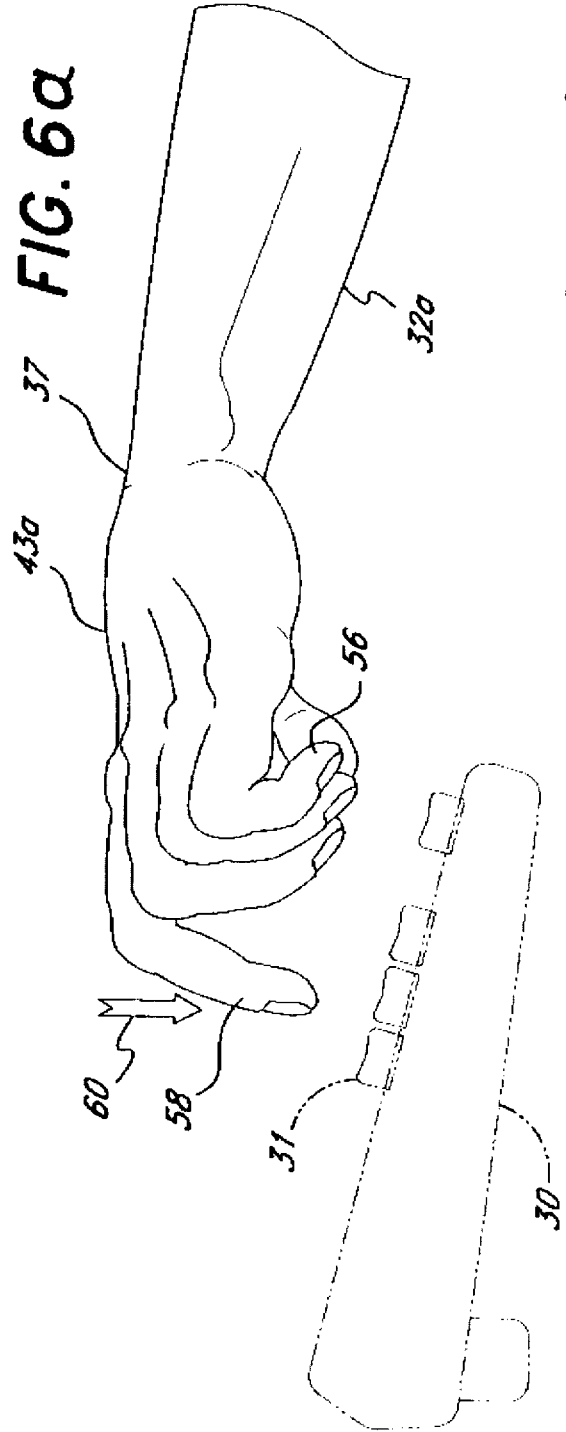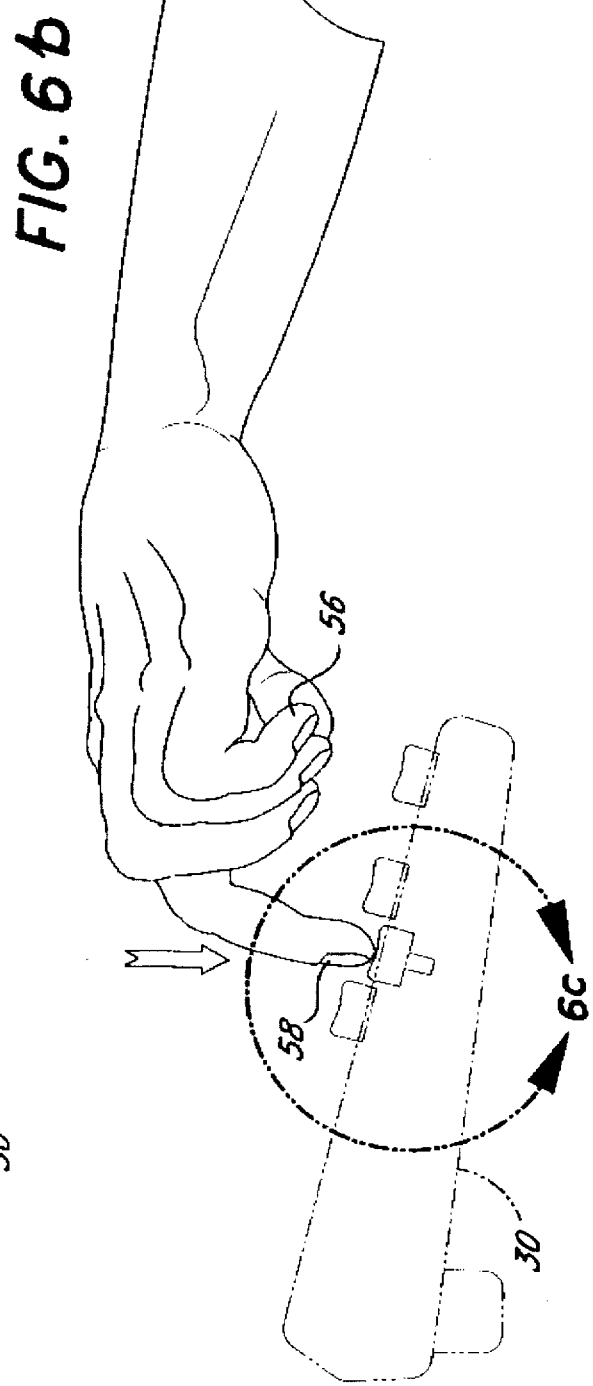

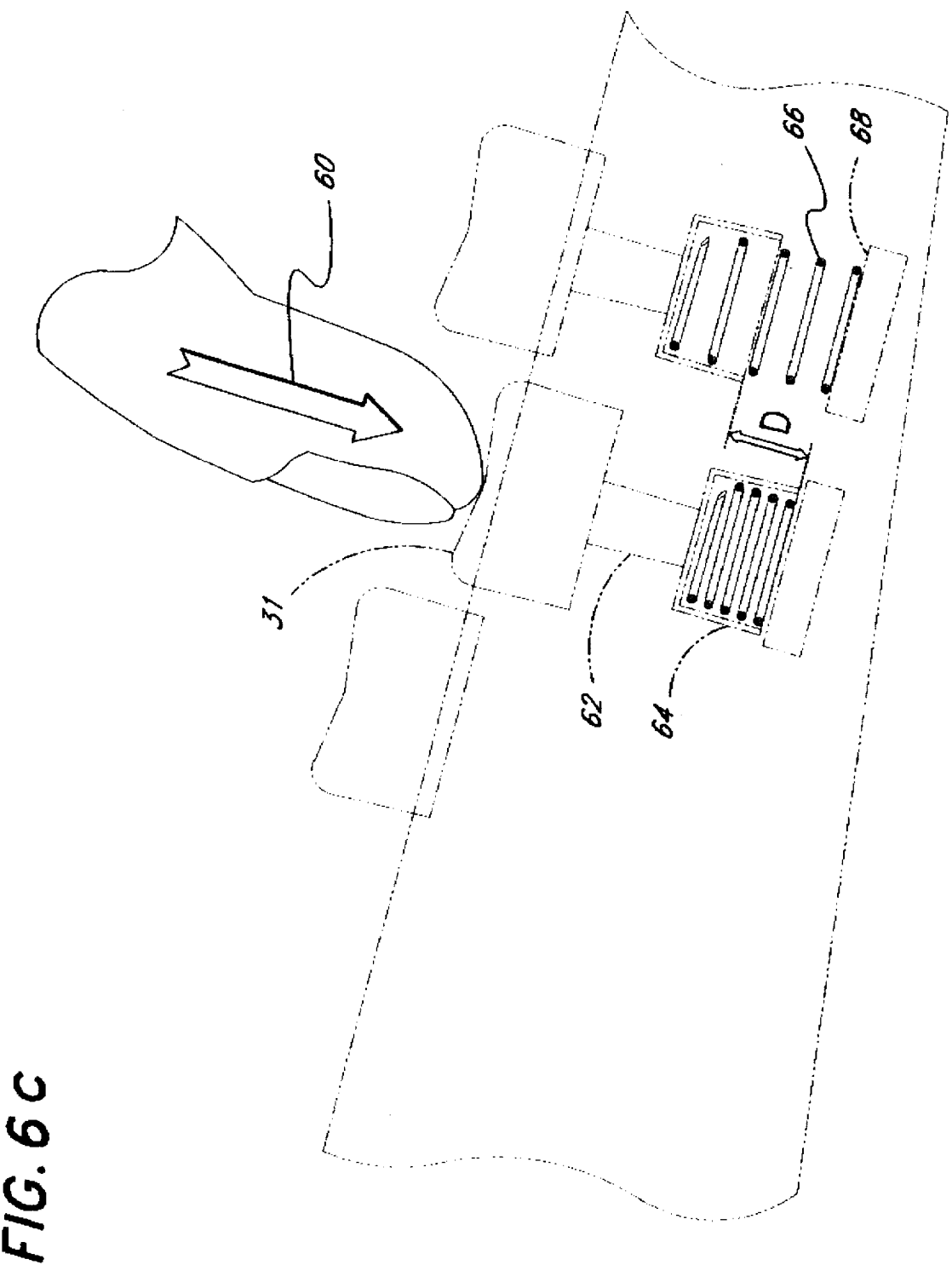

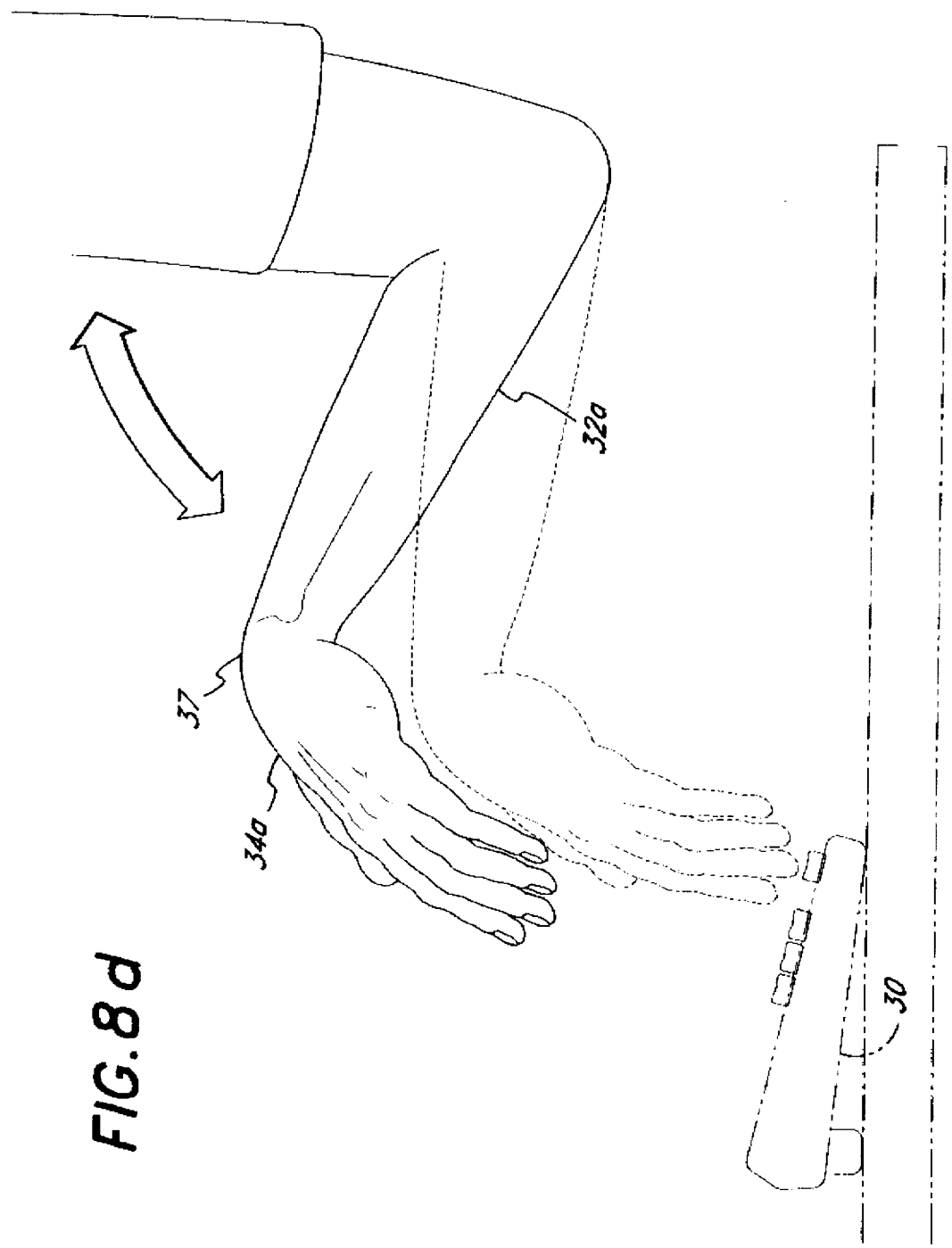

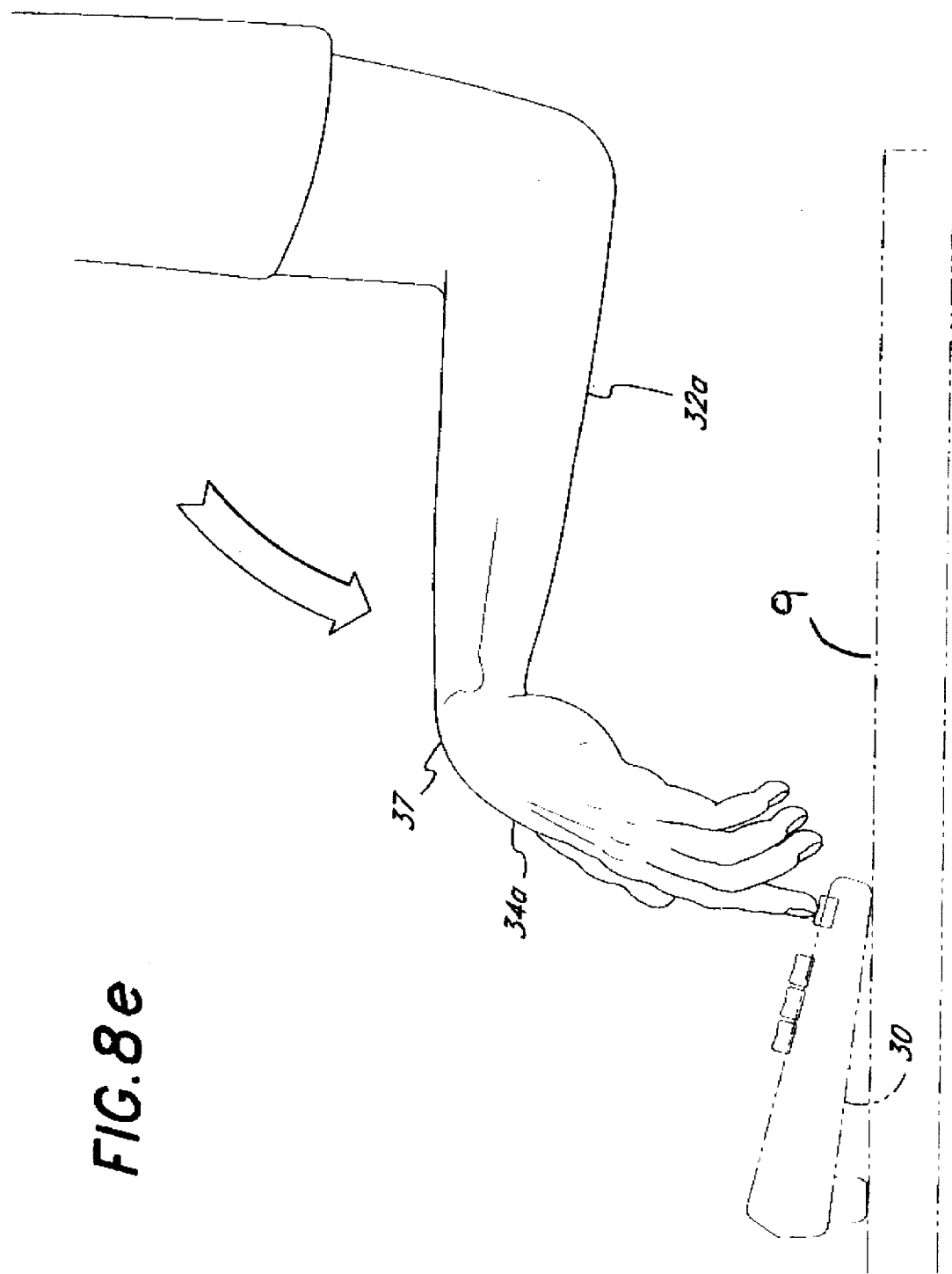

FIG. 19a
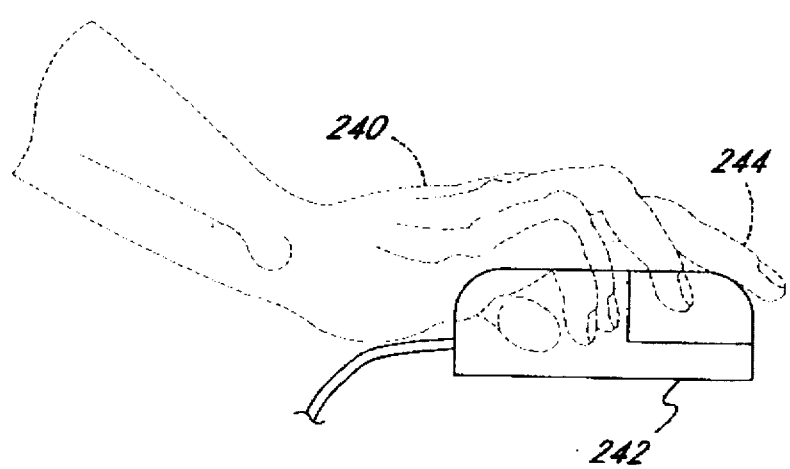
FIG. 19b
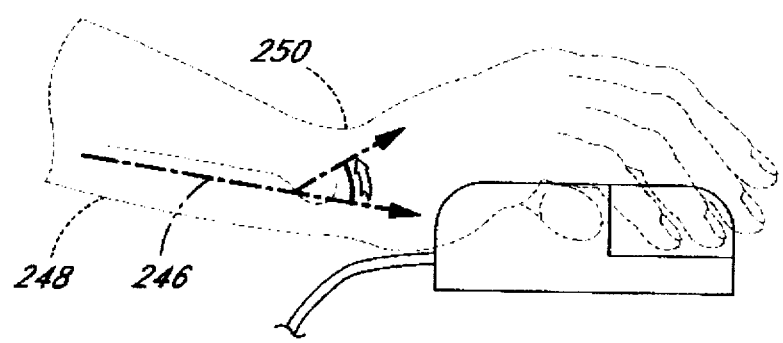
FIG. 19c
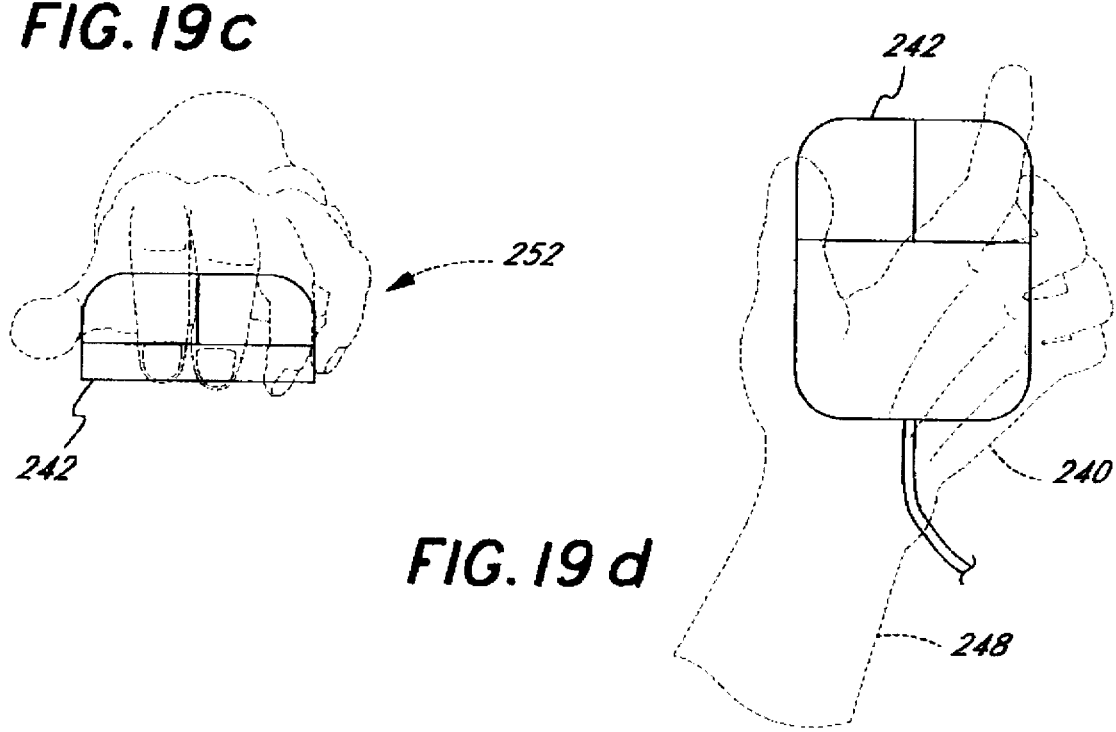
FIG. 19d

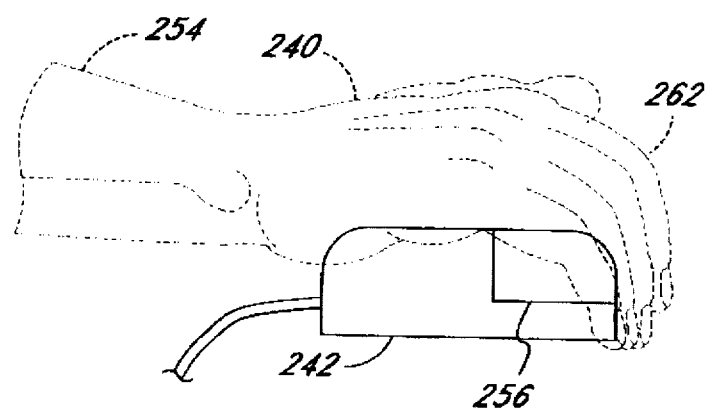
FIG. 20a
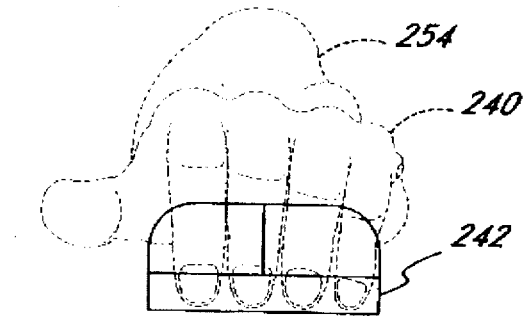
FIG. 20b
FIG. 20c
FIG. 20d
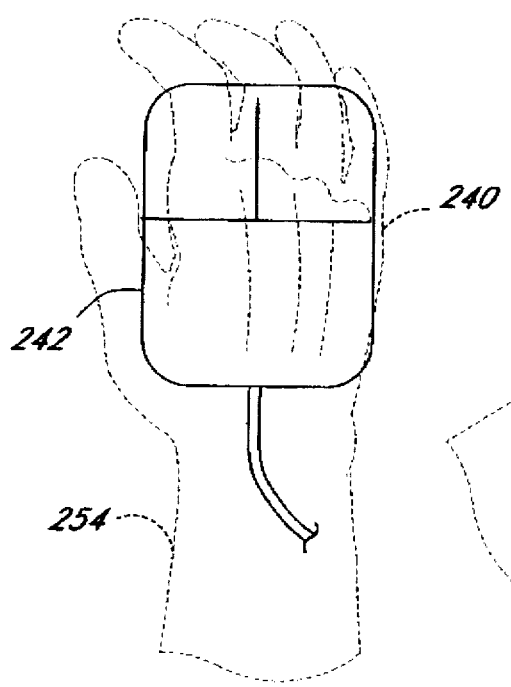
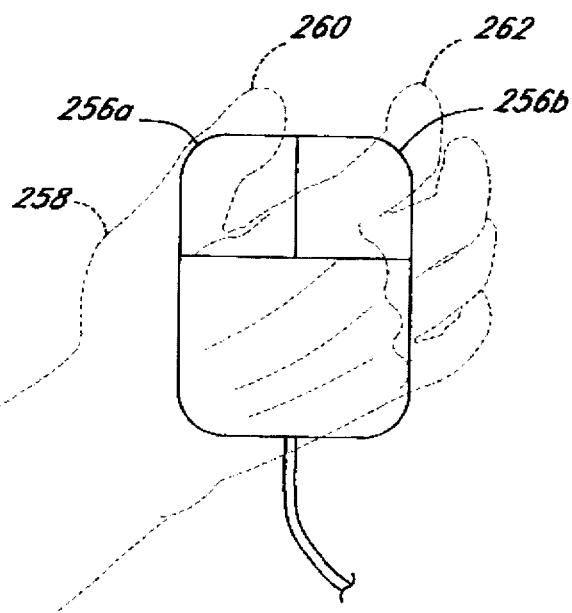

TYPING & MOUSE MANIPULATION TECHNIQUE AND INSTRUCTION METHOD

BACKGROUND OF THE INVENTION

1. Field of the Invention

This invention relates to a typing technique which avoids repetitive stress injuries and to a method of teaching the typing technique. This invention also relates to a method of manipulating a computer mouse to avoid repetitive stress injuries and to a method of teaching the mouse manipulation technique.

2. Background Discussion

Repetitive stress injury (RSI) is the sleeper disease of the nineties. Like countless other nascent outbreaks of epidemic proportions which have suddenly sprung upon the collective conscience of the nation, the leading cause of fatigue, physical irritation and injury to the average person at work has gradually become simply sitting and typing. Nearly everyone working in an office environment, or in jobs requiring constant repetitive hand movements, is at risk from repetitive stress injuries such as, for example, carpal tunnel syndrome, tendinitis, tenosynovitis, nerve entrapment, focal dystonia.

The symptoms of repetitive stress injuries range from irritated muscles, joints and tendons to complete disability of the hands. Although the number of people suffering from some variation of this malady has increased exponentially over the past few years, many people, not to mention companies and institutions, have been slow to recognize the threat. The majority of people regard this affliction as something which affects word processing and assembly line workers, and as a minor, temporary affliction. Unfortunately, this viewpoint is rather short-sighted. Due to the explosion of the microprocessor-based economy, today's worker is much more likely to be stuck at a computer terminal for long stretches, thus being exposed to a source of hidden danger. Moreover, the worst cases of repetitive stress injuries are permanent. Despite the warnings and consequences, people are slow to recognize that even moderate practice of consistently bad typing habits may be harmful.

For certain, the information-age economy has made attempts at reducing repetitive stress injuries by providing work environments designed to lessen the chance of injury. Most common among the various choices is the completely adjustable workstation which can be customized for every user. Also popular recently are the ergonomically-designed keyboards which aim to reduce injuries from bad arm and hand positioning. Still awaiting widespread development and acceptance are the voice-actuated computer and alternative keyboards, where separate keys for individual characters are replaced by manipulable keys having multiple functions.

Prior to such technological advances, many methods of typing have been available, most prominent being the "home key" method. This technique revolves around the precept that the fingers should maintain station above particular keys in a home row of keys such as the middle row of keys. The theory being the smaller the distance each finger has to travel the faster one can type. The hands are supposed to also remain in a relatively stationary position with respect to the keyboard. As a result, the fingers tend to strain to reach out of the way keys, sometimes leading to chronic stress injuries. In general, conventional typing methods fail to diminish destructive typing techniques, and in fact, exacerbate such destructive habits by emphasizing speed over comfort.

Without formal instruction, people's typing style tends to be dictated by their work environment. The height of the chair and keyboard are often not adjustable, thus inflexibly pre-determining the particular angle of the arm for typing. Both experienced and infrequent typists almost universally stretch the fingers to reach out of the way keys, and many only utilize one or two fingers on each hand, hence the pecking style of typing. Perhaps most damaging is the popular banging or digging of each keystroke which both wastes energy and subjects the fingers to significant cumulative impact stress.

In the 1940's, a piano instructor named Dorothy Taubman developed a technique for virtuoso performers. Her technique involved coordinating the independent movements of the fingers, hand and forearm resulting in a more efficient overall movement. Taubman's work eventually was recognized as having certain therapeutic benefits to those injured from constant playing. Although these benefits were lauded in some circles, most traditional teachers of piano were reluctant to admit their techniques were the cause of injury in some, and Taubman's methods were not adopted on a widespread scale. Taubman's methods are based on the theory that the individual piano keys are struck using coordinated finger, hand, wrist and arm movements approximately in the mid-range of joint articulation. This same theory is used in connection with the typing and mouse manipulation methods of this invention, yet different movements of the fingers, hands, and forearms are involved in typing and mouse manipulation.

SUMMARY OF THE INVENTION

The method of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include avoidance or reduction of repetitive stress injury without sacrificing speed.

TYPING METHOD

The method of this invention allows a typist to actuate individual keys of an alpha-numeric keyboard in a manner to avoid or minimize repetitive stress injury. The alpha-numeric keyboard includes a plurality of rows of keys at different heights, including a home row of keys, typically the center row of five rows of keys. The keys move upon manual actuation by the typist between a normally raised position off a keybed to an actuated position between the keybed and the normally raised position.

The first step of the method is that the typist initially assumes an at rest position by sitting upright before the keyboard, positioning the typist's forearms in a balanced position with the forearms resting down so that the bottom of the elbows are near the sides of the typist at about the same level as the home row of keys. The typist's hands and wrists are in a natural profile corresponding to the hands and wrists being as if at rest by the typist's side, but instead positioned in front of the keyboard, with the palms of the hands facing downward and the fingers of the hands resting lightly on the keys in a generally vertically orientation.

In the natural profile the hands are not bent at the wrist, and the middle finger and longitudinal axis of the forearm are in alignment, and the fingers are slightly curved. Each individual typist will have their own unique natural profile. A balanced position results when the forearm falls forward only under the influence of gravity, bending at the elbow and not bending at the wrist or collapsing the fingers, maintaining the natural profile of the fingers, hand, wrist, and forearm, with the shoulder and elbow in a stable, stationary condition. A balanced position produces skeletal support for the hands and arms, reducing the muscular effort needed to maintain the natural profile. A diminution in skeletal support occurs when the elbows or shoulders are pulled back away from the keyboard as the hands and forearms drop onto the keyboard, increasing the muscular effort needed to maintain the natural profile. Reduced muscular effort reduces stress, and vice versa. The natural profile provides the optimal balance between muscular support and skeletal support for the fingers, hands, wrists and forearms to minimize stress.

The second step of the method is that the typist strikes selected, individual keys using coordinated finger, hand, wrist and arm movements approximately in the midrange of joint articulation, including, as required to strike a selected key, one of the following movements: (i) leap frog type hand and arm, (ii) swinging arm, or (iii) in and out hand and arm.

(i) Leap Frog Type Hand and Arm This movement entails lifting the forearm vertically by pivoting the forearm at the elbow. At the same time, the typist moves the forearm laterally across the keyboard to position one finger adjacent one selected key and then lowering the forearm while simultaneously striking the selected key with one finger. The lateral movement is relatively short, only about ½ to about 3 inches. There is essentially no rotation about the shoulder when moving laterally. To traverse greater distances the swinging arm movement is used.

(ii) Swinging Arm This movement entails lifting the forearm vertically and rotating the typist's upper arm at the typist's shoulder which is maintained in a stable position. There is no rotation of the hand and arm. This movement is used to traverse substantial distances across the keyboard. The typist swings the forearm laterally across the keyboard to position one finger adjacent one selected key and then lowers the forearm while simultaneously striking the one selected key with one finger.

(iii) In and Out Hand and Arm This movement entails, without curling the fingers, elevating the fingers above the keyboard and lifting and moving the forearm into and away from the keyboard. The typist positions one finger adjacent one selected key and then lowers the forearm while simultaneously striking the one selected key with one finger.

The third step of the method is that the typist moves the typist's fingers, hands, and forearms substantially as a unit, with only slight pivoting of the finger at the knuckle. There is essentially no bending of the wrist. The typist times the movements of the second step to depress the one selected key, allowing the hand to drop under the influence of gravity to move the one selected key to the actuated position with optimal muscular effort upon the one finger striking the one selected key. The one finger arrives at a state of passive resting when the key bottoms out on the keybed while maintaining the one finger in a generally vertically orientation.

(iv) Rotating Hand and Arm Movement The typing method also includes coordinated finger movement to attain typing speeds in excess of 60 words per minute. This comprises lifting the hand and forearm and, while in the air, the lifting the finger at the finger-to-hand knuckle and simultaneously rotating the forearm around a longitudinal axis extending lengthwise through the forearm and middle finger of the hand. One finger is positioned adjacent one selected key and this selected key is struck with the one finger by allowing the hand to fall under the influence of gravity.

TYPING INSTRUCTIONAL METHOD

This invention includes a method whereby an instructor teaches a student to actuate individual keys of an alphanumeric keyboard in a manner to avoid or minimize repetitive stress injury to the student. The keyboard rests on a flat surface above ground level to enable the student to manipulate the keys while in a seated position.

The method involves teaching the student the following exercises:

(a) With the student in the standing position and being prompted by the instructor, the student places the student's arms at rest at the student's sides and notes the natural profile of the fingers, hands, wrists, and arms while at rest. This natural profile is the starting point from which the finger, hand, wrist, and arm movements are initiated. By limiting these movements approximately to the mid-range of joint articulation stress is minimized.

(b) With the student in the seated position and being prompted by the instructor, the student places the student's hands and arms onto the student's legs, maintaining the at rest natural profile of the fingers, hands, and wrists, except the palms of the hands face downward. The elbows of the student are relaxed.

(c) With the student maintaining relaxed shoulders and upper arms, yet providing muscular support for the wrists and forearms, and being prompted by the instructor, the student strikes the keys with a plurality of fingers. The fingers passively rest on the keys in a balanced position after striking the keys, with the keys depressed to bottom out on the keybed.

(d) With the student maintaining relaxed shoulders and upper arms, yet providing muscular support for the wrist and forearm, and being prompted by the instructor, the student allows the forearm to fall forward and come to rest with an individual finger striking one selected key. The one finger rests on the key, with the finger bent at the finger-to-hand knuckle. The palm of the hand is substantially parallel to the flat surface.

(e) With the student's elbow being unsupported and resting at the side of the student's torso, the student repeatedly allows the forearm to fall forward and come to rest, with the fingers resting on the keys and bent at the finger-to-hand knuckle, until the student experiences balancing forearm. The palm of the hand is substantially parallel to the flat surface.

(f) The student repeats step (e) using each individual finger to strike only one key while using correct hand and arm alignment developed in steps (a) and (b).

(g) The student places a finger on a key and rides the key with the finger thereon as the key moves from the normally raised position off the key bed through the actuated position, then onto the key bed, and then returning to the normally raised position.

Some students have difficulty mastering the exercise of step (c) immediately, so preliminary exercises may be conducted prior to the exercise of step (c). The following are such preparatory exercises:

(A) With the student resting the student's elbow on the flat surface, the student allows the forearm to fall forward and come to rest with the fingers resting on the keys, with the fingers bent at the finger-to-hand knuckle. The palm of the hand is substantially parallel to the flat surface.

(B) With the student in the seated position and being prompted by the instructor, the student repeatedly elevates the hands above the keyboard and drops the hands onto the keyboard, pivoting the forearms at the elbows so that fingers touch the keys without significantly depressing the keys.

(C) With the student maintaining relaxed shoulders and upper arms, yet providing support for the forearm, the instructor holds the hands of the student, one hand at a time, placing the instructor's hand on the student's hand and engaging the keys to simulate passive resting of the fingers on the keys, with the keys depressed to bottom out on the key bed.

(D) With the student in the seated position and the student's elbow resting on the flat surface, the student repeatedly elevates the hands above the keyboard and drops the hands onto the keyboard, pivoting the forearms at the elbows so that butt of the palms of the hands strike and depress the keys.

(E) With the student in the seated position and the student's elbow resting on the flat surface, the student repeatedly elevates the hands above the flat surface and drops the hands onto the flat surface, pivoting the forearms at the elbows so that the butt of the palms of the hands strikes the flat surface.

In accordance with this invention, the student repeats the exercises until attaining the ability to strike selected, individual keys using coordinated finger, hand, wrist and arm movements approximately in the mid-range of joint articulation, to demonstrate proficiency in the three basic key stroke movements, and preferably, also the fourth movement for speed. The student, after mastering the exercises, practices the movements to attain proficiency in moving the fingers, hand and forearm as a unit and timing of the keystroke as required by the third step of the typing method.

MOUSE MANIPULATION METHOD

This invention also includes a method by which a typist manipulates a mouse in a manner to avoid or minimize repetitive stress injury. The mouse includes an actuation button providing an audible sound when depressed and a palm support at a rear section of the mouse. The actuation button is along the forward section of the mouse and the mouse rest on a flat surface.

The first step of the method is that the typist with one of the typist's hand and wrist in a natural profile corresponding to said hand and wrist being as if at rest by the typist's side is positioned over the mouse. The palm of the hand faces downward and the fingers of the hands extend over and engage the forward section of the mouse, including the actuation button. The butt of the palm rests on the rear section.

The second step of the method is that the typist elevates the forearm and elbow above the flat surface and moves the forearm laterally, but does not bend the wrist, to move the mouse across the flat surface. The typists avoids gripping the mouse with the fingers of the typist's hand and allows the weight of the typist's forearm to rest down on the mouse.

The third step of the method is that the typist actuates the actuation button using the underside portion of the finger engaging the actuation button to depress the actuation button only to the point of the audible sound.

If the hand of the typist is large a portion of the palm rests on the flat surface. The hand has a longitudinal axis extending along the middle finger through the hand which may be used as a reference to orient the mouse. With very large hands, the mouse is at a substantially diagonal orientation from about 30 to 60 degrees with respect to the longitudinal axis of the hand.

MOUSE MANIPULATION INSTRUCTIONAL METHOD

This invention also includes a method whereby an instructor teaches a student to manipulate a mouse in a manner to avoid or minimize repetitive stress injury to the student. In this method the student masters the following exercises:

(a) With the student in the standing position and being prompted by the instructor, the student places the student's arms at rest at the student's sides noting the natural profile curvature and position of the fingers, hands, wrists, and arms while at rest.

(b) With the student in the seated position and being prompted by the instructor, the student places the student's hands and arms onto the student's legs, maintaining the at rest profile curvature and position of the fingers, hands, and wrists with the palms of the hands facing downward and the elbows of the student being relaxed.

(c) With the student maintaining relaxed shoulders and upper arms, yet providing muscular support for the wrist and forearm, and being prompted by the instructor, the student drops the hand and forearm onto the mouse to cover the mouse with the palm of the hand facing downward and the fingers of the hands extending over and engaging the forward section of the mouse, including the actuation button. The butt of the palm rests on the rear section, maintaining said natural profile curvature and position of the fingers, hands, wrists, and arms.

(d) The student, with prompting by the instructor, elevates the forearm and elbow above the flat surface and moves the forearm laterally, but does not bend the wrist, to move the mouse across the flat surface while avoiding gripping the mouse with the fingers of the student's hand.

(e) The student, with prompting by the instructor, actuates the actuation button using the underside portion of the finger engaging the actuation button to depress the actuation button only to the point of the audible sound.

Where the student has a large hand, the instructor first prompts the student to place the student's hand on edge so that the edge of the palm rests on the flat surface and is generally perpendicular to the flat surface with the mouse generally parallel to the palm. The student next allows the hand to fall onto the mouse with a portion of the palm resting on the flat surface. Where the student has a large hand the instructor prompts the student to place the mouse at a substantially diagonal orientation with respect to the longitudinal axis of the hand.

Both instructional methods of this invention may be taught in a class room environment, in a one-to-one private setting, or through the use of a video program which may be viewed at the convenience of the student.

DESCRIPTION OF THE DRAWING

The preferred embodiment of this invention, illustrating all its features, will now be discussed in detail. This embodiment depicts the novel and non-obvious method of this invention as shown in the accompanying drawing, which is for illustrative purposes only. This drawing includes the following figures (FIGS.), with like numerals indicating like parts:

FIG. 6a is a side elevational view of a keyboard and an typist's hand illustrating an initial forced downward motion of an isolated finger toward a key;

FIG. 6b is a side elevational view similar to FIG. 6a illustrating the continued forced downward motion of the isolated finger upon impact with the key;

FIG. 6c is a detail of FIG. 6b illustrating the depressed key in section and the continued forced downward motion of the isolated finger as the key bottoms out on the keyboard;

FIG. 8b is a front elevational view of the hands in the natural profile taken along line 8b—8b of FIG. 8a.

FIG. 8d is a side view of the the typist's arm in its natural profile with the fingers generally vertically oriented and the hand and arm aligned;

FIG. 8e is a plan view taken along line 8e—8e of FIG. 8d;

FIGS. 19a–19d are various views of the hand of an typist demonstrating incorrect techniques for holding a computer mouse;

FIGS. 20a–20d are various views of the hand of an typist demonstrating correct techniques for holding a computer mouse.

DETAILED DESCRIPTION OF THE PREFERRED EMBODIMENTS

The present invention contemplates a subtle yet radical shift in the way people type so as to reduce the chance of repetitive stress injuries. Because of the small shift in movement of the fingers, hands and arms to attain the proper technique described herein, it is appropriate to contrast a number of bad typing habits.

EXAMPLES OF IMPROPER TYPING TECHNIQUES

Figure 1:
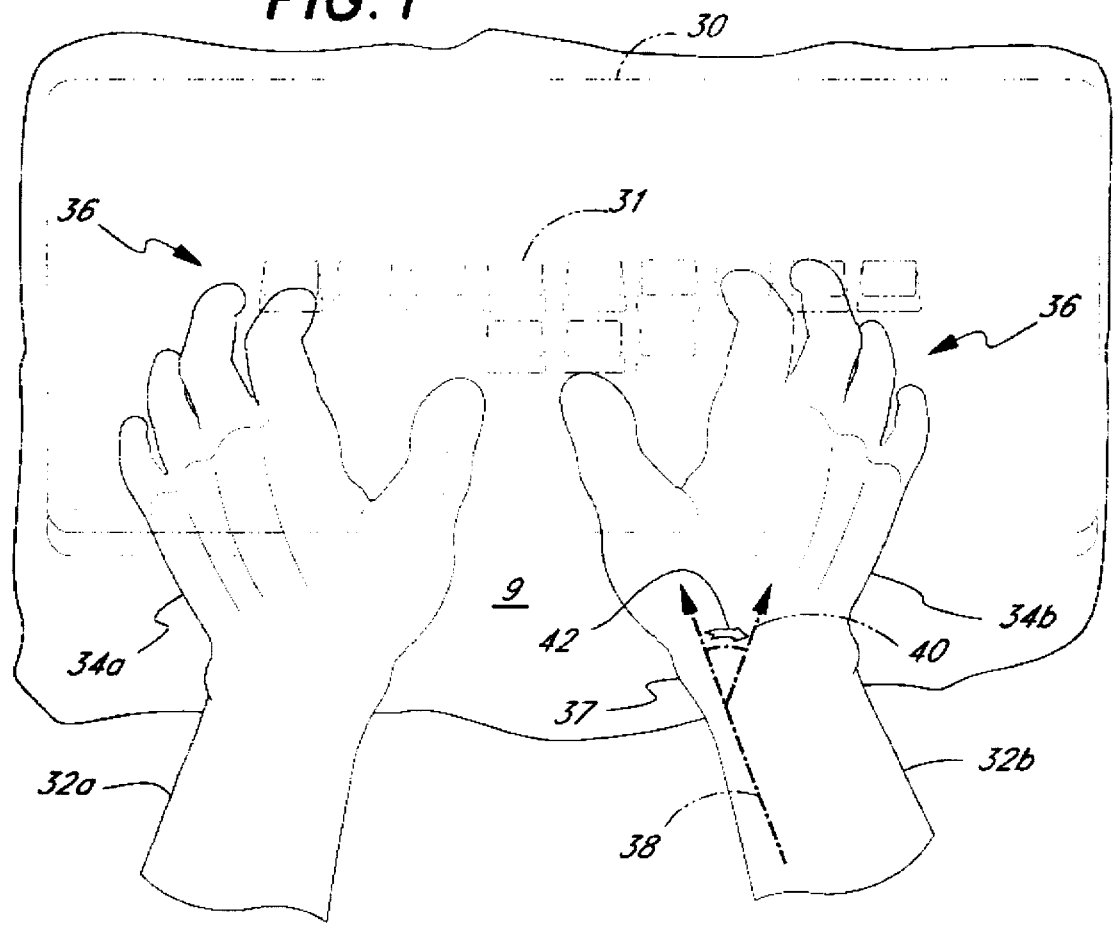
FIG. 1 is a plan view of a keyboard and the hands of keyboard typist illustrating an incorrect ulnar deviation of the wrist.
Figure 2:
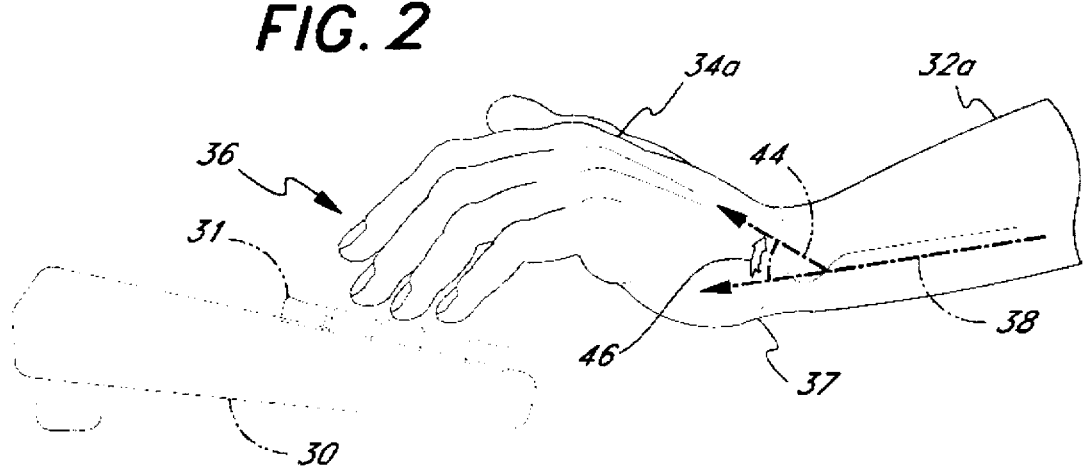
FIG. 2 is a side elevational view of a keyboard and an typist's hand illustrating an incorrect dropping of the wrist.

FIGS. 1 and 2 shows a conventional keyboard 30 having keys 31 in phantom with the keyboard resting on the flat surface 9 of a typing table. A keyboard typist's forearms 32a, 32b and hands 34a, 34b are positioned over the keyboard 30 with the fingers 36 arrayed in a conventional typing stance. The forearms 32a,b define longitudinal axes, one of which is shown for the right arm at 38. The keys 31 are arranged in five rows usually at different heights, with the middle or home row of keys 31a, being the third row.

To reach the middle keys 31a, the forearms 32a,b angle inward slightly from the elbows (not shown). In this improper hand position or twisting, known as ulnar deviation, the hands 34a,b swing outward at the wrist 37 from the axis 38 in the direction of arrow 42 to define an axis 40. In this hand position, not only are certain muscle groups held in a contracted state to rotate the wrist, but the long extensor muscles connected to the fingers bend at the wrist, thus straining these muscles when manipulating the fingers rapidly for extended periods.

FIG. 2 illustrates the left forearm 32a and associated longitudinal axis 38 angled downward toward the keyboard 30. The plane of the hand 34a is upturned at the wrist 37 to generally follow the line 44. This condition is encouraged by the tilt of a conventional keyboard face due to the differing heights of the rows of keys 31, and the incorrect arm and hand position is termed a dropped wrist. Here, the extensor muscles on the back or posterior side of the forearm contract to lift the hand 34a in the direction of arrow 46, at the same time that long flexor muscles on the anterior side of the forearm contract to manipulate the fingers 36. This temporary condition places unnecessary strain on the muscles and tendons involved, as the opposing muscle groups are working against one another by contracting simultaneously. Furthermore, dropped wrists contribute to tension in the carpal tunnel, which can stress tendons as well as interfere with the functioning of the ulnar nerve which passes through the wrist.

Figure 3:
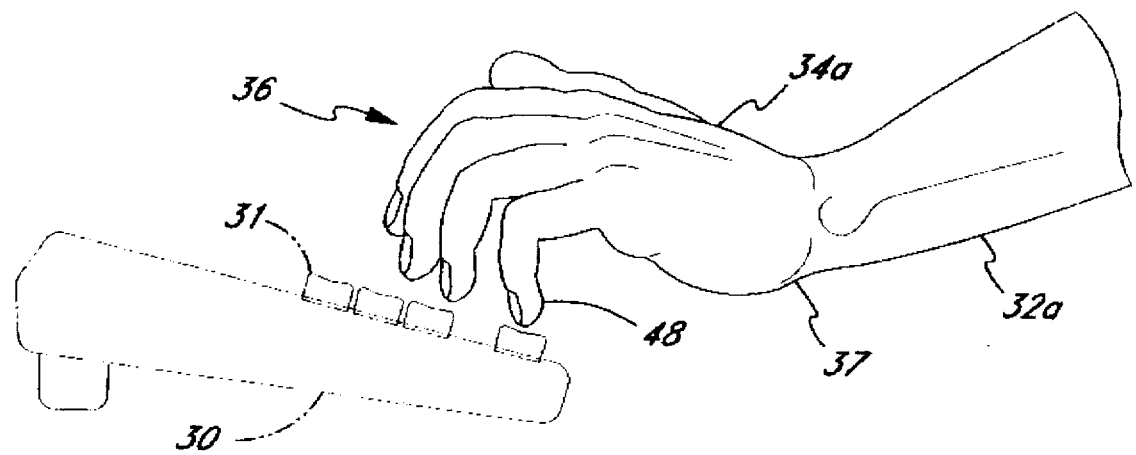
FIG. 3 is a side elevational view of a keyboard and an typist's hand illustrating an incorrect over-curling of one of the fingers.

Another common technique which may result in injury is over-curling of the fingers. As seen in FIG. 3, the pinkie finger 48 is pulled under the left hand 34a of the typist to strike a key lower down on the keyboard 30. Over-curling is produced by a simultaneous contraction of long extensors on the posterior side and long flexors on the anterior side of the forearm 32a. Again, this creates an antagonistic muscular contraction in the finger, hand and arm. The over-curled finger is 48 also a type of muscular fixation that limits the mobility of surrounding fingers. The strain produced by over-curling of the fingers may lead to serious injury when coupled with repeated impact of the finger 48 on the keys 31.

Figure 4:
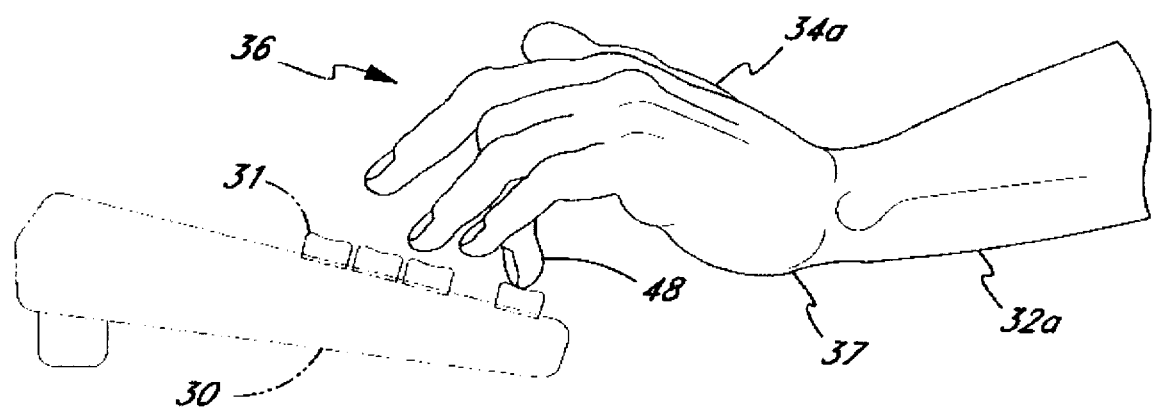
FIG. 4 is a side elevational view of a keyboard and an typist's hand illustrating an incorrect isolated use of one of the fingers.

In FIG. 4, the left hand 34a of the typist demonstrates an improper, isolated movement of one of the fingers 36, in this case the middle finger 48. Not only is the finger 50 over-curled, its movement is not shared by its neighbors, thus creating stress between adjacent flexor muscles used to bend the fingers.

Figure 5A:
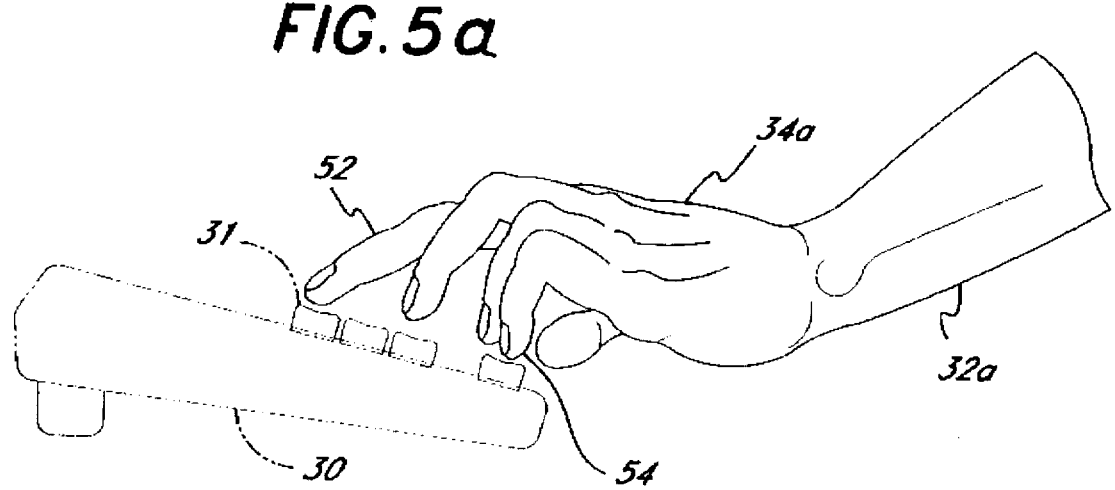
FIG. 5a is a side elevational view of a keyboard and an typist's hand illustrating an incorrect reaching motion of one of the fingers.
Figure 5B:
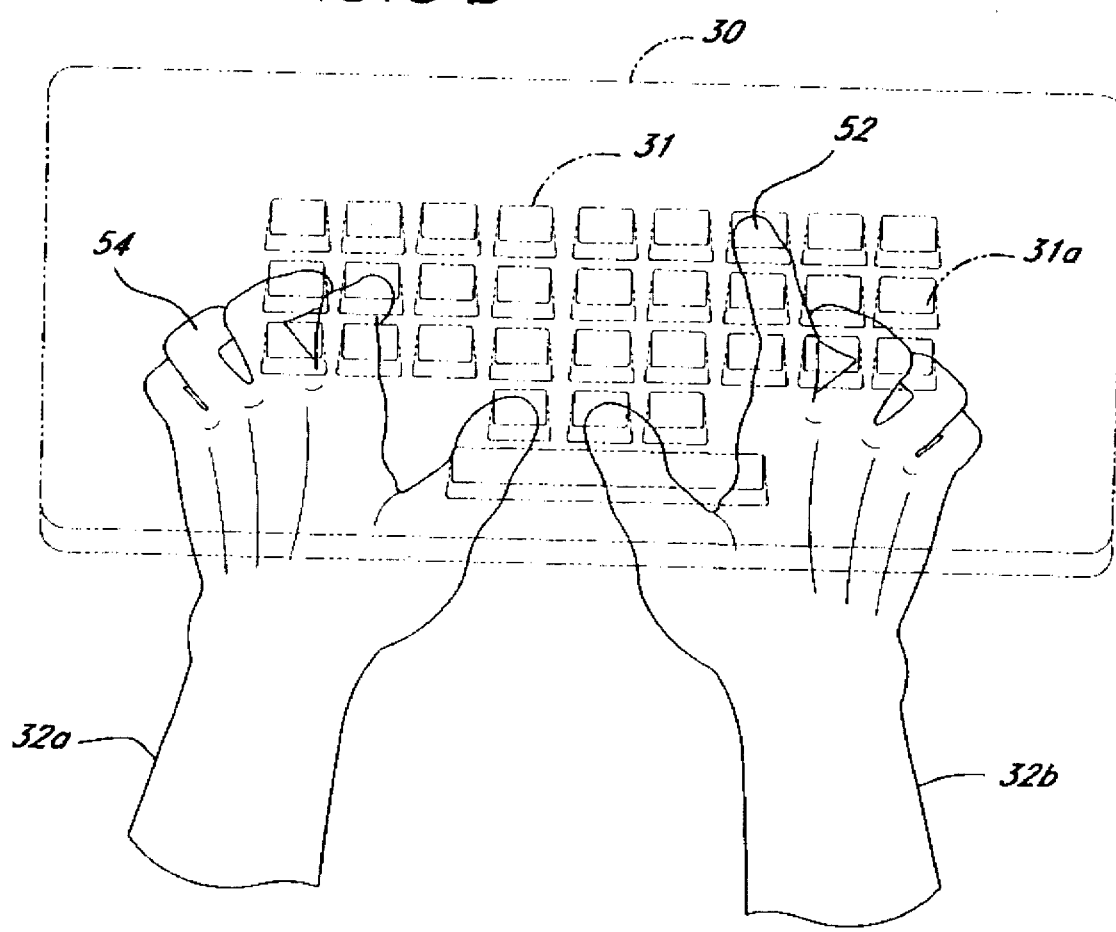
FIG. 5b is a plan view of a keyboard and an typist's hands illustrating the incorrect reaching motion of one of the fingers of the right hand and an incorrect over-curling of several fingers on both hands.

FIGS. 5a and 5b illustrate the improper techniques of over-curling, isolated movement and reaching. The index finger 52 of the right hand 34b is shown reaching forward on the keyboard a significant distance ahead of the remaining fingers. This isolated extension required to reach forward creates stress on adjacent finger muscle groups. The other fingers 54 are over-curled which promotes fixation of the fingers in a claw-like manner.

FIGS. 6a–c demonstrate an improper technique for striking a key 31. FIGS. 6a and 6b also illustrate a correctly straightened wrist 37 but highly over-curled fingers 56. The index finger 56 is directed downward with a force indicated by arrow 60. Most people either do not consider the amount of force needed to actuate a key, or learned to type without such a consideration. Consequently, the force arrow 60 remains constant all the way to the bottom of the key travel.

FIG. 6c shows the key 31 in section revealing having a stem 62 terminating in a housing 64 which surrounds a return spring 66. The spring 66 applies a bias tending to separate the housing 64 from a portion of the keybed 68 resetting the keys to an unactuated position. The right side of FIG. 6c shows a key 31 in the unactuated position a distance D above the keybed 68. The finger 58 depresses the key 31 until the housing 64 contacts the keybed 68. All the way up to and including the impact between the housing 64 and keybed 68, the downward force 60 remains essentially constant. Upon impact, therefore, the kinetic energy present in the finger/key couple is dissipated as a shock into the keybed 68 and upward into the finger 58. While the keybed 68 can absorb repeated impacts, the finger 58 suffers microscopic stress which, over time, may accumulate into a tangible physical injury. The overuse of force when striking the keys is termed digging. Many people are conditioned to "dig" each key to ensure the key is actuated. However, most computer keys typically actuate during the first ⅓–½ of travel from the unactuated position. The rest of the downstroke of the key is unnecessary, except to confirm to the typist that the key has been depressed sufficiently.

Figure 7A:
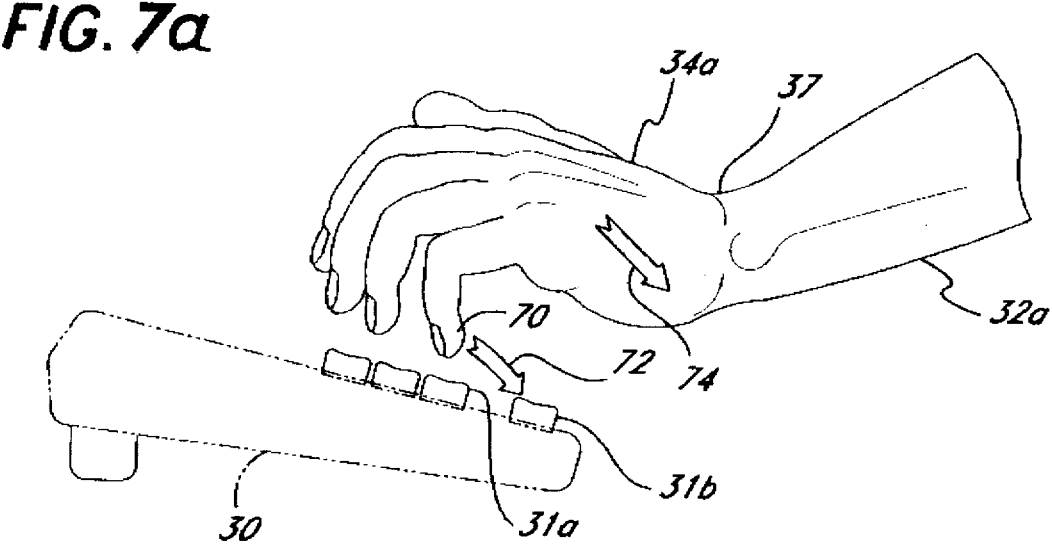
FIG. 7a is a side elevational view of a keyboard and an typist's hand illustrating the beginning of an incorrect grabbing motion of the hand when moving backward on the keyboard.
Figure 7B:
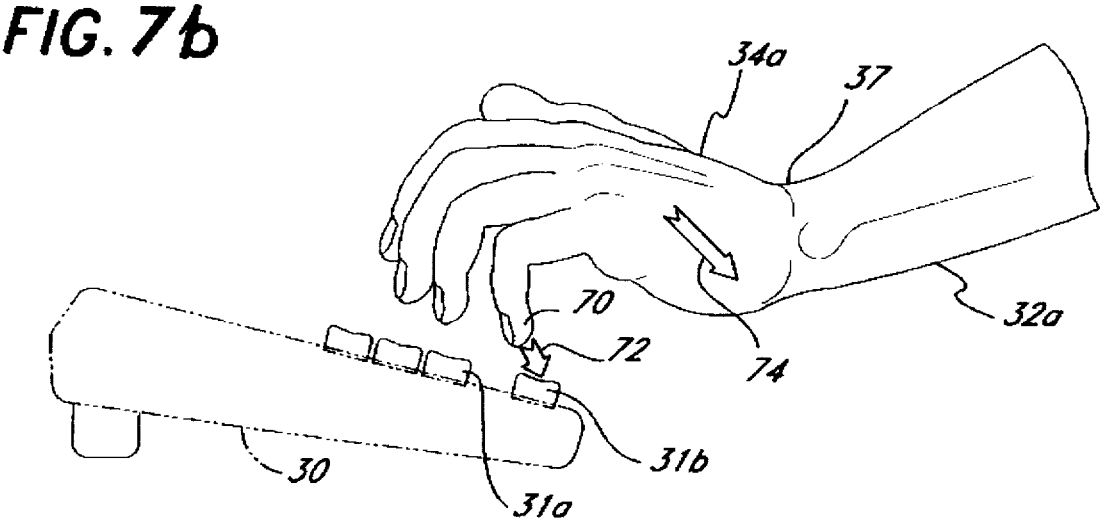
FIG. 7b is a side elevational view similar to FIG. 7a illustrating the completion of the incorrect grabbing motion of the hand.

FIGS. 7a and 7b illustrate an improper typing technique termed grabbing. The pinkie finger 70 of the left hand 34a moves from a first key 31a down the keyboard to a second key 31b. If the elbow (not shown) pulls backward away from the keyboard 30 as the forearm 32a drops, the typist will likely experience some instability in the precise position of the hand 34a. The pinkie 72 will travel along the path of arrow 72, while the general hand movement will be in the direction of arrow 74. To correct the feeling of instability, the typist will "grab" at the lower key 31b so that the pinkie 70 strikes the key at an angle, as shown by arrow 76. Not only is there more of a risk of missing the key 31b, but the timing of striking the key is upset resulting in over or under application of force.

Another harmful typing habit is known as "hovering." Hovering is when the hands are elevated above the keyboard with excess tension in the upper arm, forcing the upper arm to hold the static weight of the forearm and leading to instability and mis-timing of the keystrokes.

TYPING TECHNIQUE OF THIS INVENTION

Now that the various examples of bad typing technique have been discussed, the proper technique will be described. Generally, the technique coordinates the movement of all of the active body parts during a keystroke, from the fingertip to the shoulder, to reduce the movement of any one part. The joints are articulated in their mid-range of movement starting with the hand and forearm being in a natural profile, discussed subsequently in greater detail. The fully implemented method provides sympathetic movement of adjacent moving parts and eliminates any antagonistic muscle contractions. The method pointedly avoids movements of any affected limb outside its mid-range of motion. In particular, the fingers remain within a mid-range of motion to either side of a completely relaxed naturally curved position when starting from a natural profile (FIGS. 8d and 8e). Finally, the method teaches improved keystroke timing to reduce impact with the keyboard 30.

NATURAL PROFILE

Figure 8A:
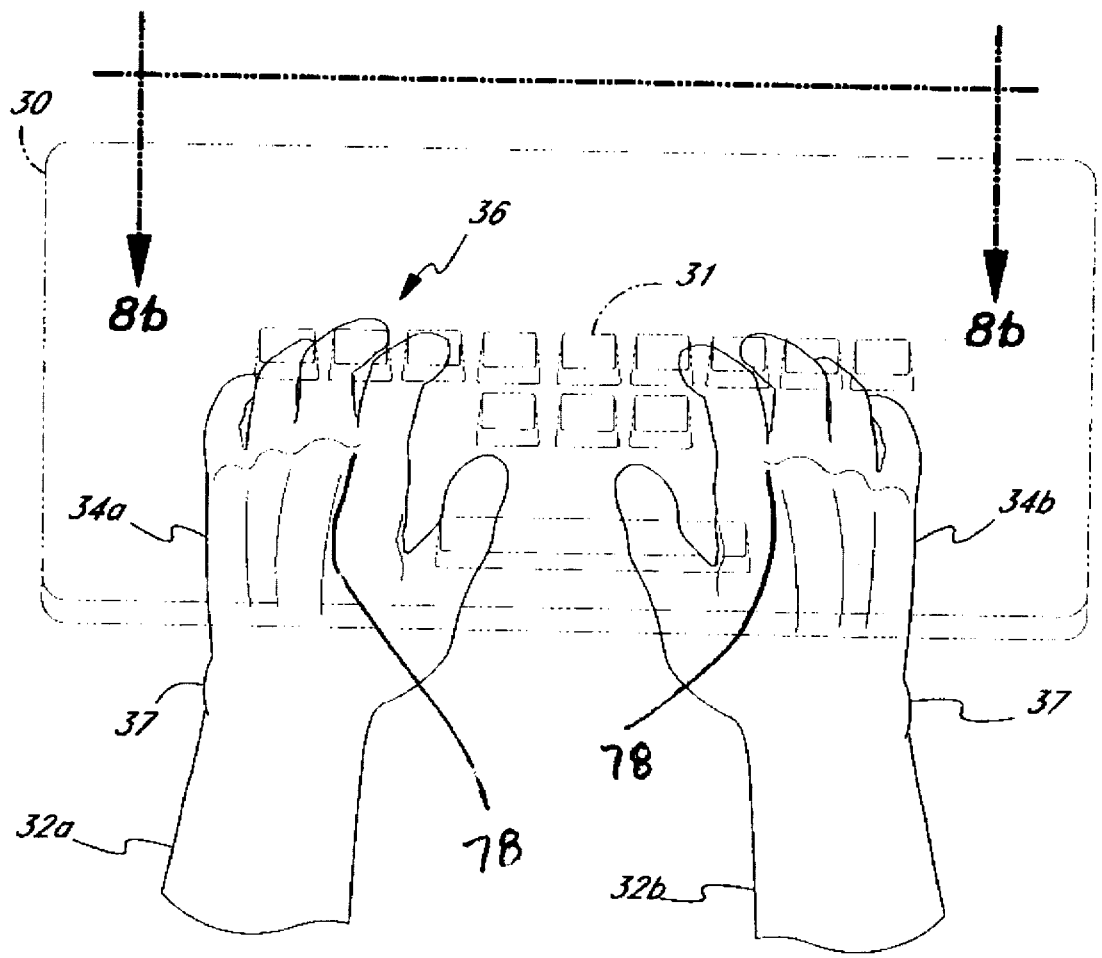
FIG. 8a is a plan view of a keyboard illustrating correct natural profile of the hands and fingers of an typist.
Figure 8B:
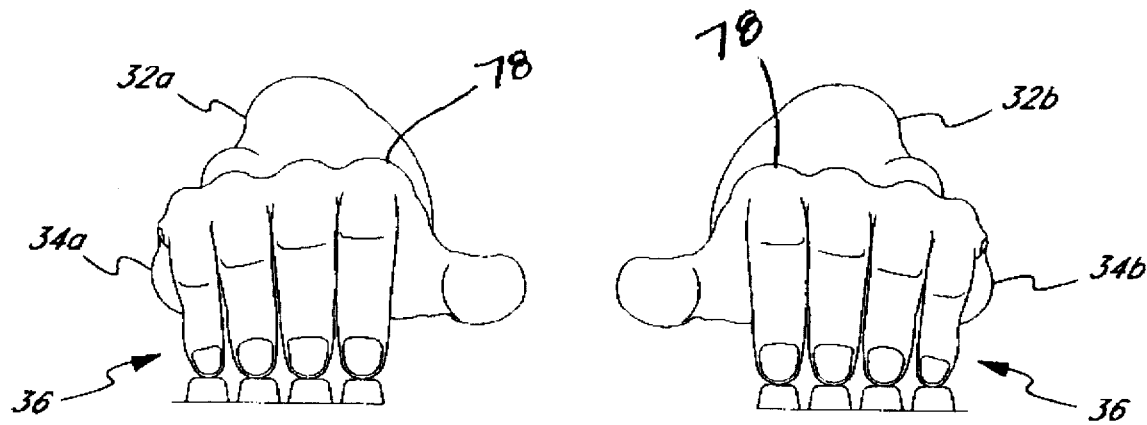
Figure 12A:
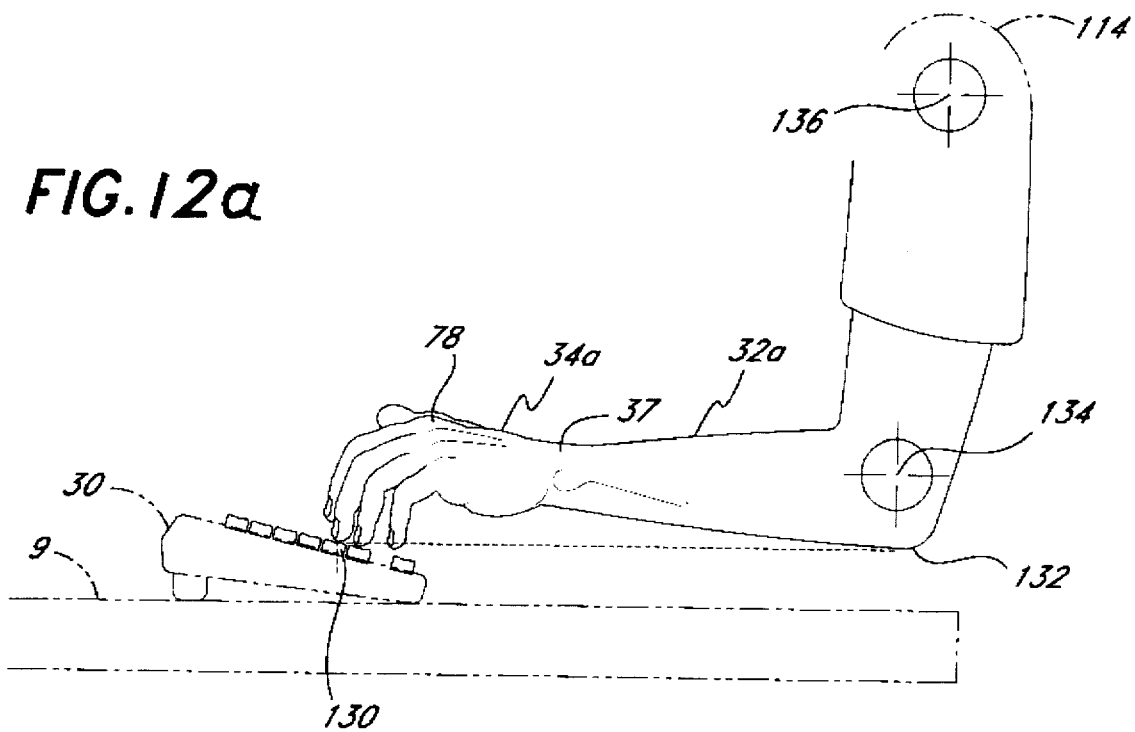
FIGS. 12a–12f are side elevational views of a keyboard and an typist's left arm illustrating the correct technique for walking the fingers forward over the keyboard.

The natural profile of the fingers 36, hands 34, wrists 37, and forearms 32 is seen in FIGS. 8a, 8b, and 12a. In this condition, the wrists 37 maintain the hands 34 aligned with the longitudinal axis of the forearms 32. The fingers 36 are gently curved down toward the keys 31 in a relaxed, natural relationship. The height of the wrist 37 and index finger finger-to-hand knuckle 78 are at about the same height, but this varies slightly with each individual. In other words, the finger-to-hand knuckle 78 and the the wrist 37 are approximately horizontally aligned.

Figure 15A:
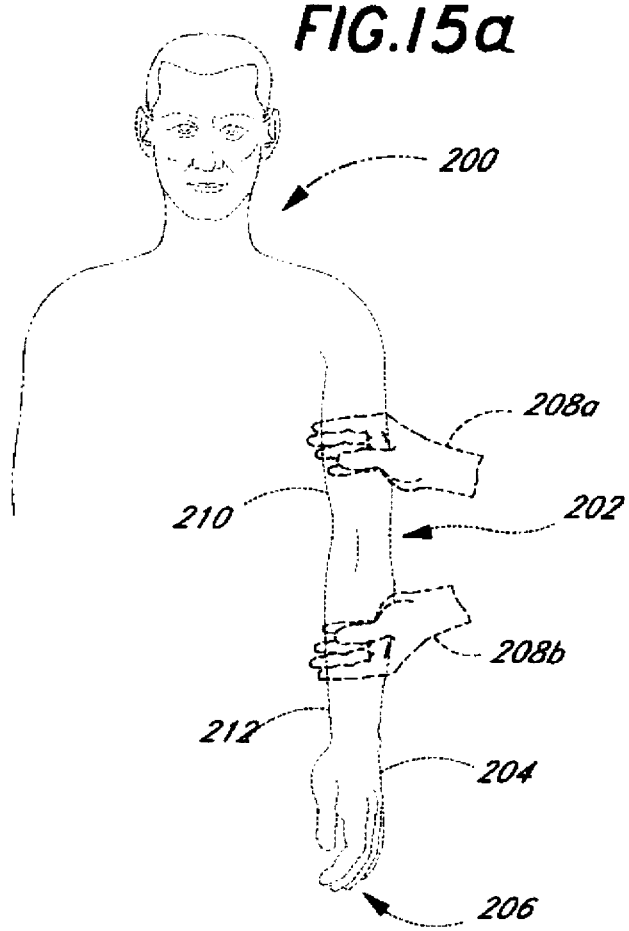
FIGS. 15a–15b are front elevational views showing the hands of an instructor manipulating a student's arm into a relaxed position at the side in preparation for positioning the arm for typing.

To achieve the natural profile the typist starts with the the arms at the side of the torso as shown in FIG. 15a, with the hands 34 relaxed and the fingers 36 in a naturally curved position. The forearms 32 are raised and placed over the keyboard 30 and allowed to drop under the influence of gravity. Upon engaging the keys, the finger which engages a key is at approximately an angle of 30 to 75 degrees, depending on the finger and the shape of individual typist's hand. The finger is bent at the finger-to-hand knuckle, to support the hand and forearm. The hands aligned with the forearms so that both are in essentially the same plane. The elbow is raised off the table and is in about the same plane as the tip of the finger engaging the key. This provides skeletal support to counteract the weight of the hands and arms, minimizing the use of muscular force, and consequently stress.

Figure 8C:
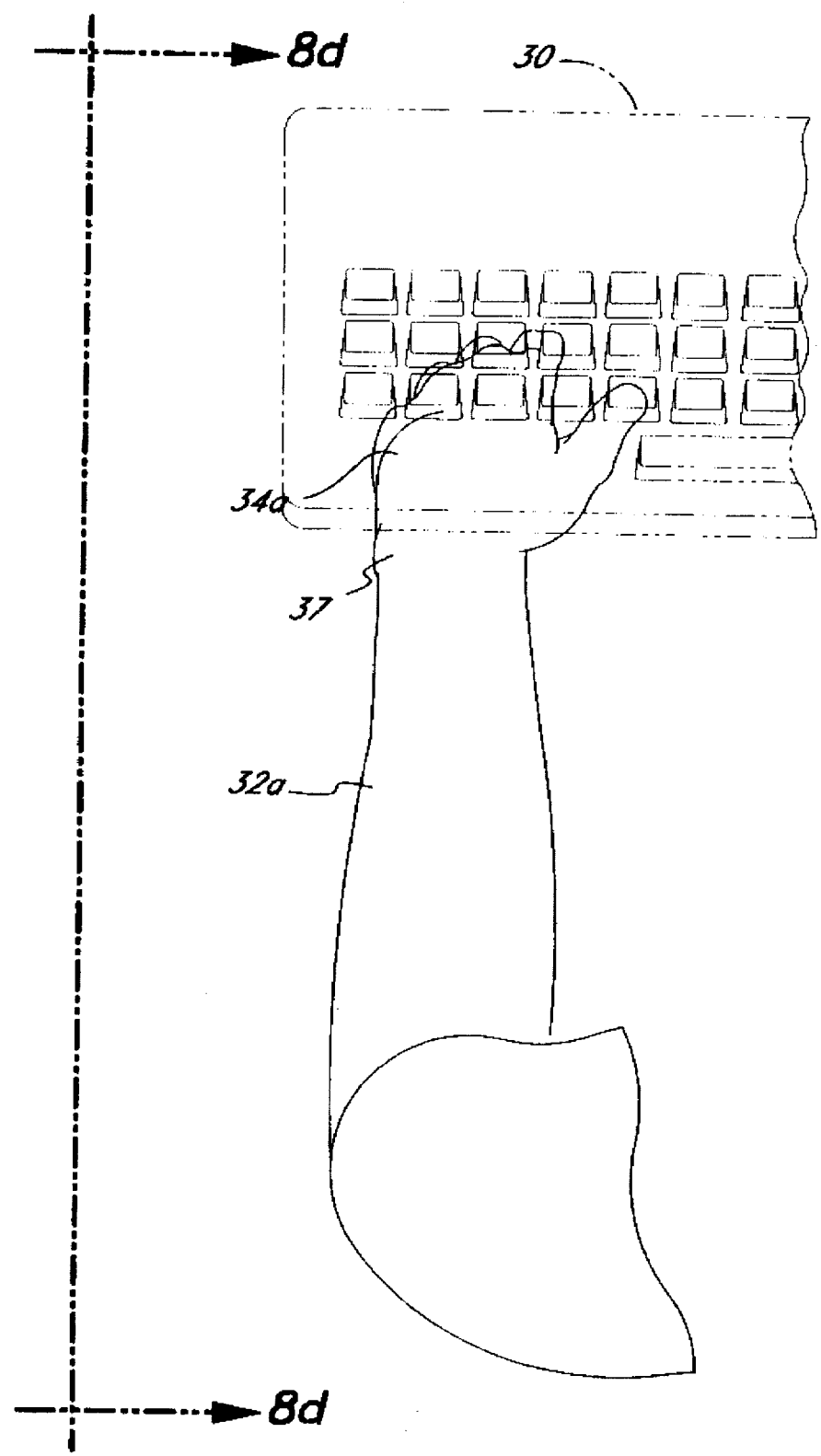
FIG. 8c is a side view showing the typist's arm, with the wrist relaxed, falling under the influence of gravity to passively engage the keyboard in order to assume the correct natural profile of the hands and fingers of an typist.

In the natural profile there is the optimal balance between skeletal support and muscular support of the fingers, hands, wrists and forearms to minimize stress. The typist can experience this support by comparing the hand position that provides maximum skeletal support with the hand position in the natural profile. The hand position providing maximum skeletal support occurs when the hand is allowed to fall forward as shown in FIGS. 8c and 8d to come rest with the fingers and hand in a substantially vertical position with one finger resting down on a key as shown in FIG. 8e. With the hand in the position shown in FIG. 8e, almost no muscular effort in needed to support the weight of the finger, hand and arm. The typist upon moving the hand between the position shown in FIG. 8e to the position shown in FIG. 12a will experience the change in muscular effort needed to support the weight of the of the finger, hand and arm while in the natural profile.

ROTATING HAND AND ARM MOVEMENT

The rotational hand and arm movement enables the typist to achieve speeds in excess of 60 words per minute. Some typists do not aspire to attain these speeds, and will use only the leap frog type movement described subsequently.

Figure 9A:
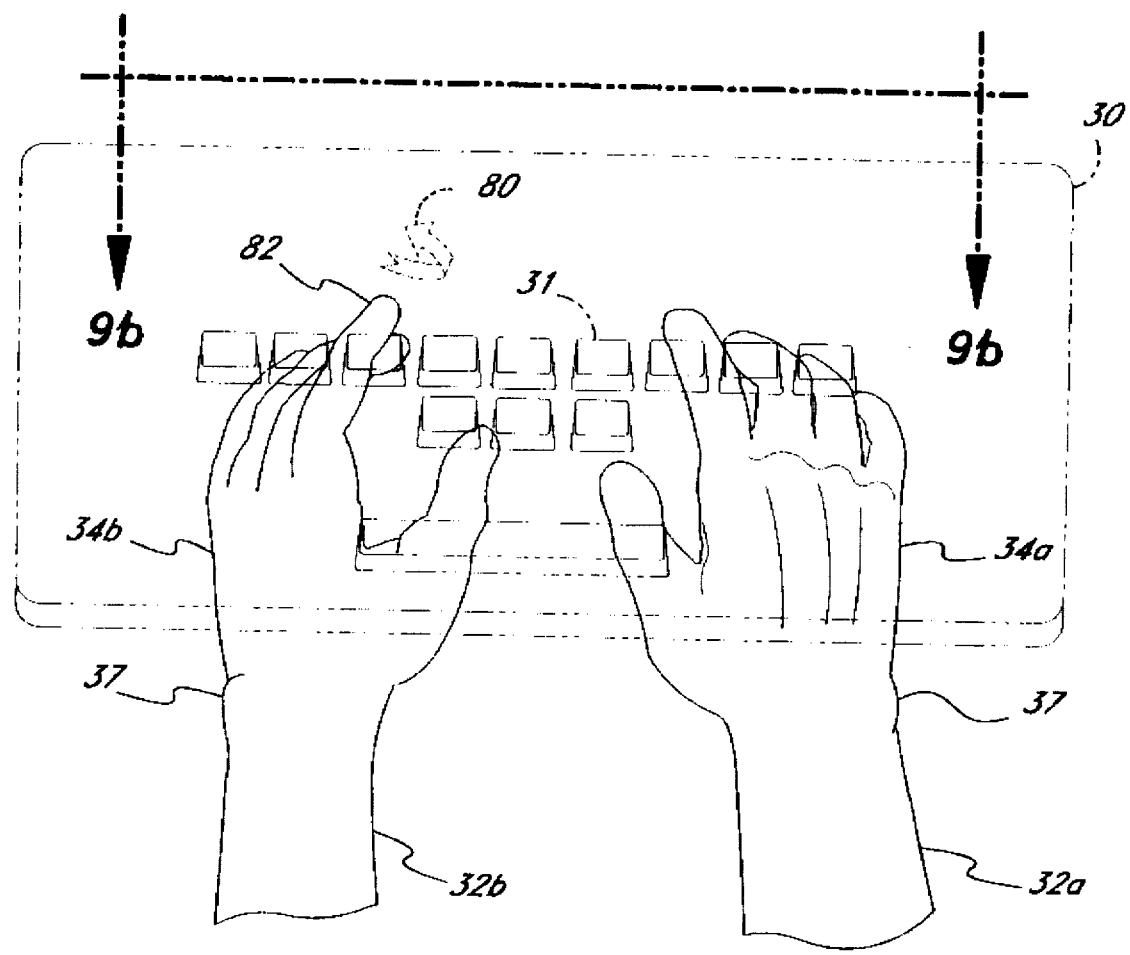
FIG. 9a is a plan view of a keyboard and an typist's hands illustrating a correct technique for lifting the inner fingers from the keyboard.
Figure 9B:
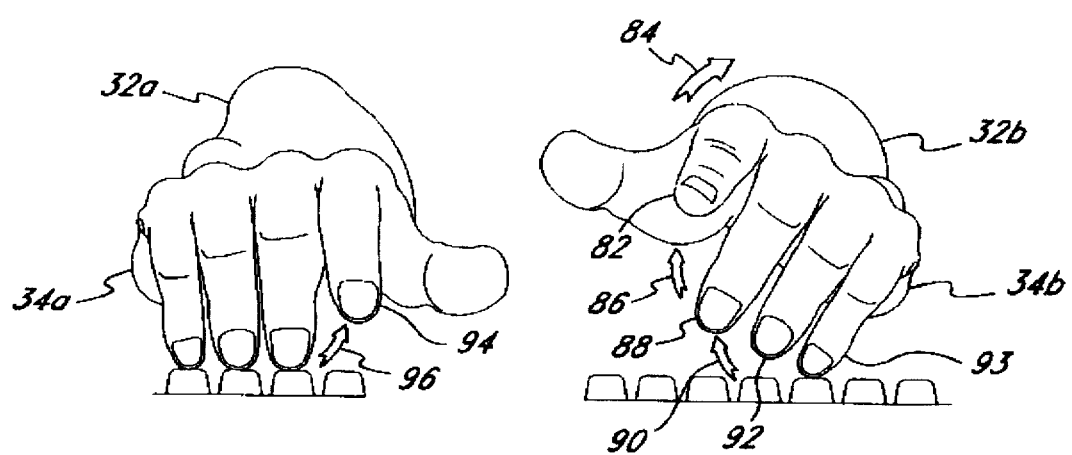
FIG. 9b is a front elevational view taken along line 9b—9b of FIG. 9a showing the correct technique for lifting the inner fingers.

Referring now to FIGS. 9a and 9b, the typist's two arms are positioned above the keyboard 30 in different stages of lifting the inner fingers. The left hand 34b rotates generally outward to lift the inner fingers beginning with the thumb 81 and index finger 82. Arrow 80 shows the gross rotation of the left hand 34b. The left forearm 32a causes rotation of the hand 34a by rotating about its longitudinal axis in the direction of arrow 84 (FIG. 9b). The rotation of the forearm outward, causing the thumb 81 to be lifted first, is termed pronation.

In conjunction with the hand rotation, the inner fingers lift within their mid-range of motion. The radius of the arc of travel of the hand 34a substantially exceeds that of the fingers and the total height the fingers are lifted is relative to the summation of the two arcs, greatly exceeding the range of motion of the fingers alone. Preferably, the total arc of travel of the fingers is approximately 2–3 times that of the hand 34a, but with the larger diameter rotation of the hand, the fingers lift up to three times as far as without forearm rotation.

The lifting of the index finger 82 leads the forearm rotation and is closely followed by sympathetic movement of the adjacent fingers. More particularly, as the index finger 82 lifts along the path of arrow 86, the middle finger 88 follows along arrow 90. Finally, the ring finger 92 lifts a small amount in a sympathetic movement, although it may not be utilized in the particular typing action. The pinkie 93 remains essentially still in its position above the keys 31, although it may not be in actual contact with the keys as shown. The degree of hand rotation will be greatest when utilizing the thumb 81 to strike the space bar at the rear of the keyboard 30.

FIG. 9b also shows the right hand 34b at the beginning of a movement lifting the inner fingers. The index finger 94 lifts along arrow 96 prior to pronation of the forearm 32b. The present typing method eliminates isolated finger movement by teaching sympathetic movement of all the fingers. In this scheme, only the finger that will eventually strike the next key is actively, or consciously, lifted. The remaining fingers move passively, or sympathetically, with the active finger. Thus, in FIG. 9b, the index finger 94 is initially actively lifted, yet the adjacent fingers will follow passively as shown in FIG. 9a. This beneficial sympathetic finger movement, when learnt, is quite natural, yet must be taught to the typist because the traditional training promotes isolated movement of the striking finger.

Using another nomenclature, the fingers are numbered in sequence from one to five beginning with the thumb 81. Only the first four fingers may lift when the hand is rotated outward, or pronated. Thus, the pinkie 93 is only lifted when the hand rotates in the opposite direction (supponation). Lifting the inner fingers precedes a subsequent downward rotation or lateral move across the keyboard 30, as will be more fully explained below.

Figure 10A:
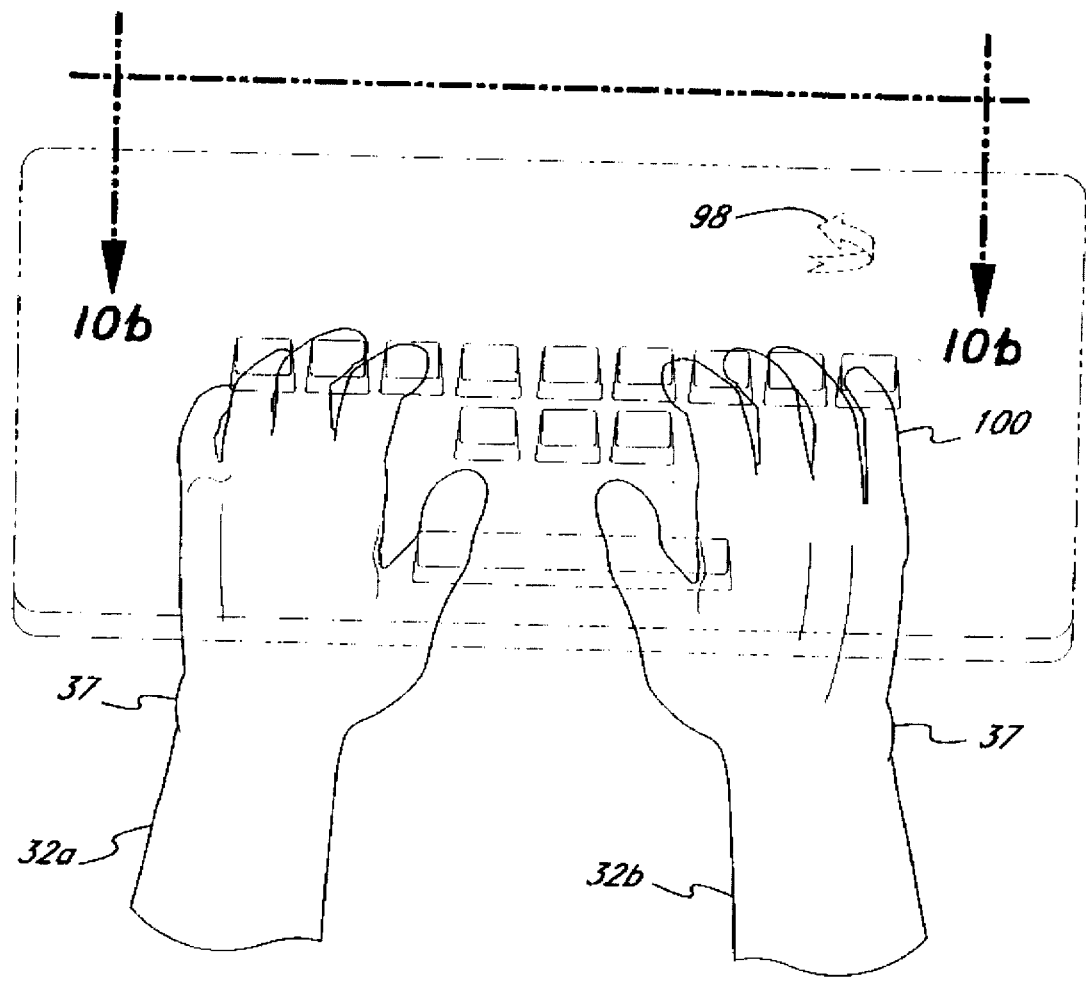
FIG. 10a is a plan view of a keyboard and an typist's hands illustrating a correct technique for lifting the outer fingers from the keyboard.
Figure 10B:
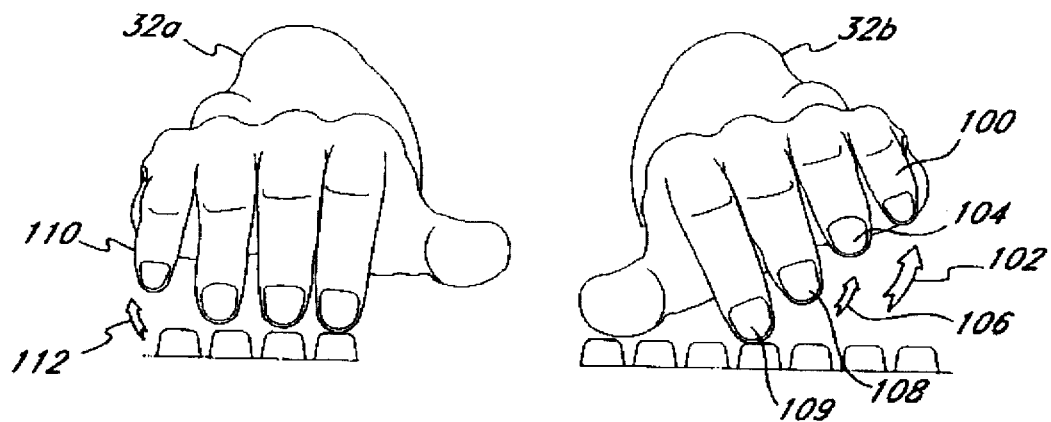
FIG. 10b is a front elevational view taken along line 10b—10b of FIG. 10a showing the correct technique for lifting the outer fingers.

In FIGS. 10a and 10b, two arms are shown above a keyboard 30 in different stages of lifting the outer fingers. The left hand 34a rotates generally inward to lift the outer fingers beginning with the pinkie 100. Arrow 98 shows the gross rotation of the left hand 34b. The left forearm 32a initiates the rotation of the hand 34a by rotating about its longitudinal axis in the direction of arrow 101 (FIG. 10b). The rotation of the forearm inward in this manner is termed supponation. The lifting of the pinkie 100 leads the forearm rotation and is closely followed by sympathetic movement of the adjacent fingers. More particularly, as the pinkie 100 lifts along the path of arrow 102, the ring finger 104 follows along arrow 106. Finally, the middle finger 108 lifts a small amount in a sympathetic movement, although it may not be utilized in the particular typing action. The thumb 111 remains essentially still, or may move slightly toward the keys 31 as shown. Using the numerical nomenclature, only fingers 2–5 lift when the hand is rotated in supponation. Lifting the outer fingers in this manner precedes a subsequent downward rotation or lateral move across the keyboard 30, as will be more fully explained below. FIG. 10b also shows the right hand 34b at the beginning of a movement lifting the outer fingers. The pinkie 110 lifts along arrow 112 prior to supponation of the forearm 32b and sympathetic movement of the adjacent fingers.

LEAP FROG TYPE HAND AND ARM

This movement entails lifting the forearm vertically by pivoting the forearm at the elbow. At the same time, the typist moves the forearm laterally across the keyboard to position one finger adjacent one selected key and then lowering the forearm while simultaneously striking the selected key with one finger. There is essentially no rotation about the shoulder, although to achieve high speed it is desirable to rotate the hand as discussed above, and combine the leap frog and rotational hand and arm movements. This, however, is not essential. The lateral movement is relatively short, only about ½ to about 3 inches. To traverse greater distances the swinging arm movement is used.

Since majority of lateral movements across the keyboard are from one key to another within a range of four or five keys to either side, the leap frog movement is the most highly used movement. In practice, the vertical components in these short movements will blend with the lateral swinging component. The result is a number of short throwing motions wherein the forearms are rotated in pronation or supponation and "thrown" to the next key in sequence by a slight swinging of the forearm. Said another way, these short movements are accomplished not by a conscious lateral swing of the forearm, but by the lateral momentum created by the rotating forearm leading to the fingers being "thrown" to the next key. Stringing a sequence of these short lateral moves together will hide the slight rotation and sympathetic finger lifting, so that the aggregate will be barely perceptible and resemble the conventional technique having no hand rotation. However, the typist will experience much less stress overall, and with little or no effect on the typing speed.

SWINGING ARM

Figure 11:
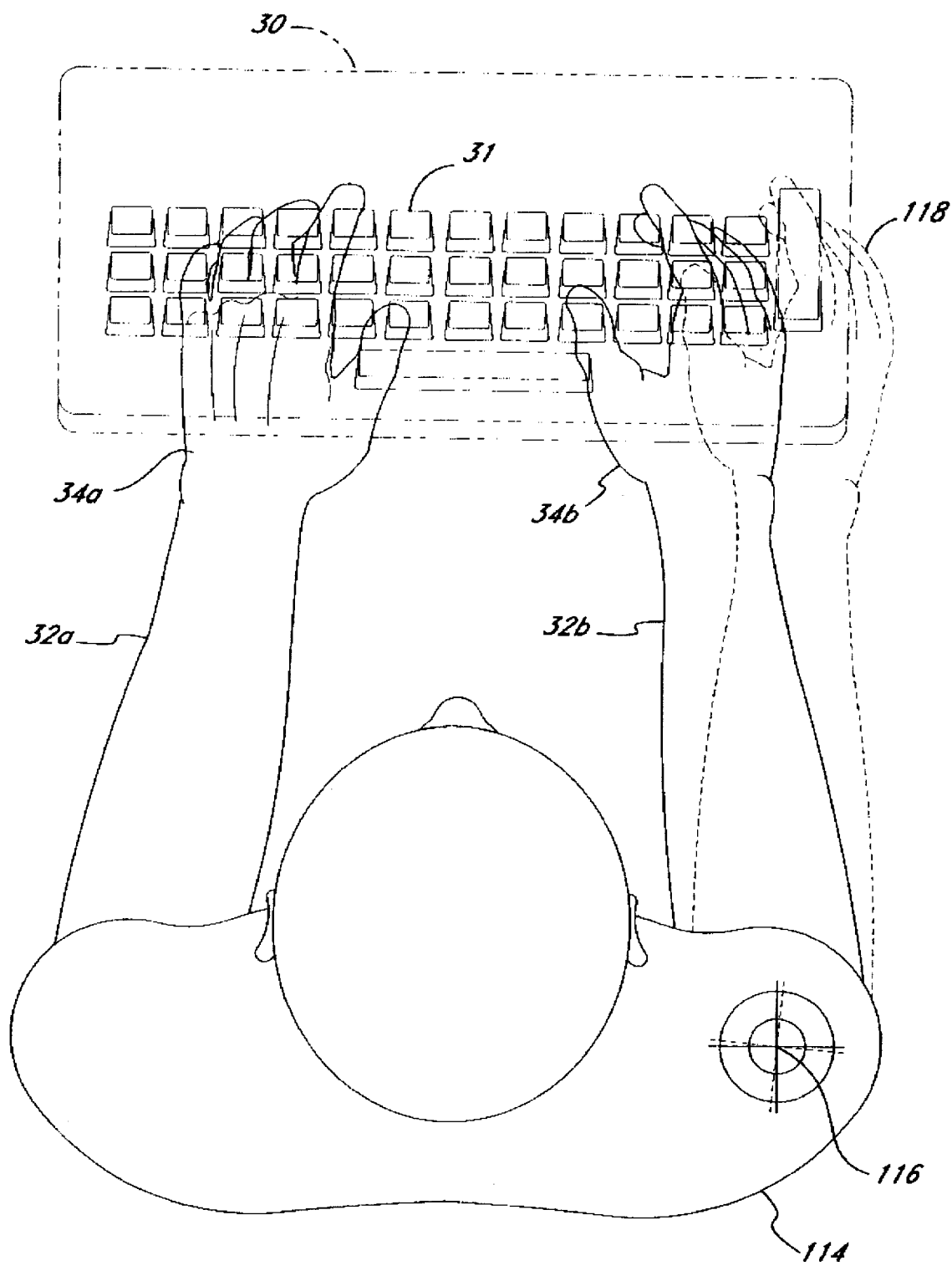
FIG. 11 is a plan view of an typist at a keyboard demonstrating the correct technique for lifting the inner fingers of the right hand and swinging the right forearm outward above the keyboard.

The swinging arm movement starts by lifting the fingers, hands and arms as a unit, without any substantial rotation about the longitudinal axis of the forearm, but with rotation about the shoulder. FIG. 11 illustrates this movement wherein the right forearm 32b swings outward about an axis through the shoulder 114. The axis 116 follows the upper arm (not shown) and extends generally vertically through the shoulder 114 and elbow. First, the right hand 34b and inner fingers lift up off the keyboard 30 and then the forearm 32b swings outward. In this manner, keys 31 on the far right side of the keyboard 30 may be actuated without reaching or isolating individual fingers. Of course, the reverse movement from the outer portion to the inner portion of the keyboard 30 is accomplished with a similar inward swinging of the forearm 32b.

FIG. 11 illustrates the swinging of the right arm over an intermediate distance across the keyboard 30. Smaller or larger swinging motions are accomplished using essentially the same technique of lifting, swinging, then dropping the hand and forearms. The larger motions are typically utilized when actuating the outermost keys or the row of function keys at the front edge of the keyboard.

IN AND OUT HAND AND ARM

Another movement for positioning the hands is in and out over the keyboard. FIGS. 12a–12f illustrate a sequence of movements from a rearward portion of the keyboard 30 closest to the typist to a forward portion of the keyboard away from the typist. An essential prerequisite for proper typing is the horizontal alignment of the forearm, hand and fingers. The forearm should extend generally horizontally from the elbow and the wrist should remain straight and not dropped. The fingers assume a natural curve therefrom.

FIG. 12a is a side elevational view of a keyboard and an typist's left hand 34a and forearm 32a in a natural profile. It will be noted that the correct arm position according to the present invention places the finger tips 130 in approximately the same horizontal plane as the elbow 132. The axis of rotation of the elbow is indicated at 134. This axis 134 is preferably positioned vertically below the axis of rotation 136 of the shoulder 114. Observing these limb relationships is essential for fully realizing the beneficial aspects of the present typing method. This presumes that the keyboard 30 is height-adjustable relative to the typist. However, even if the finger tips 130 are slightly lowered or raised with respect to the elbow 132, certain aspects of the present method may be implemented with a reduced yet still significant benefit to the typist.

Figure 12B:
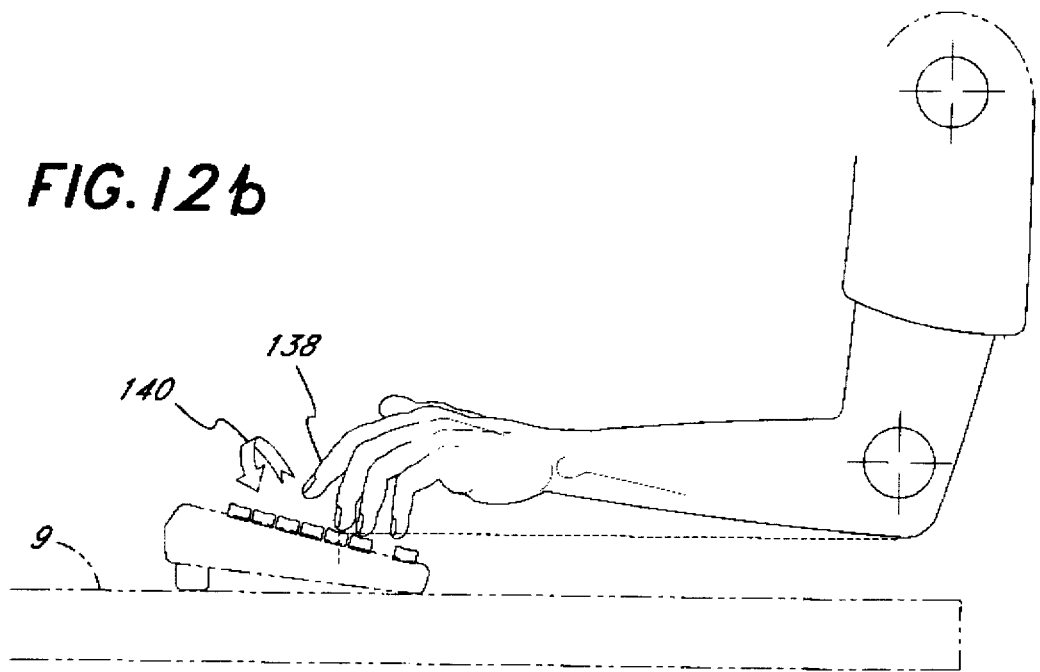

FIG. 12b shows the index finger 138 beginning to lift and the hand 34a to rotate, as indicated by arrow 140. As mentioned previously, this lifting will always be followed by sympathetic movement of adjacent fingers and further rotating of the forearm 32a to rotate the hand 34a in pronation.

Figure 12C:
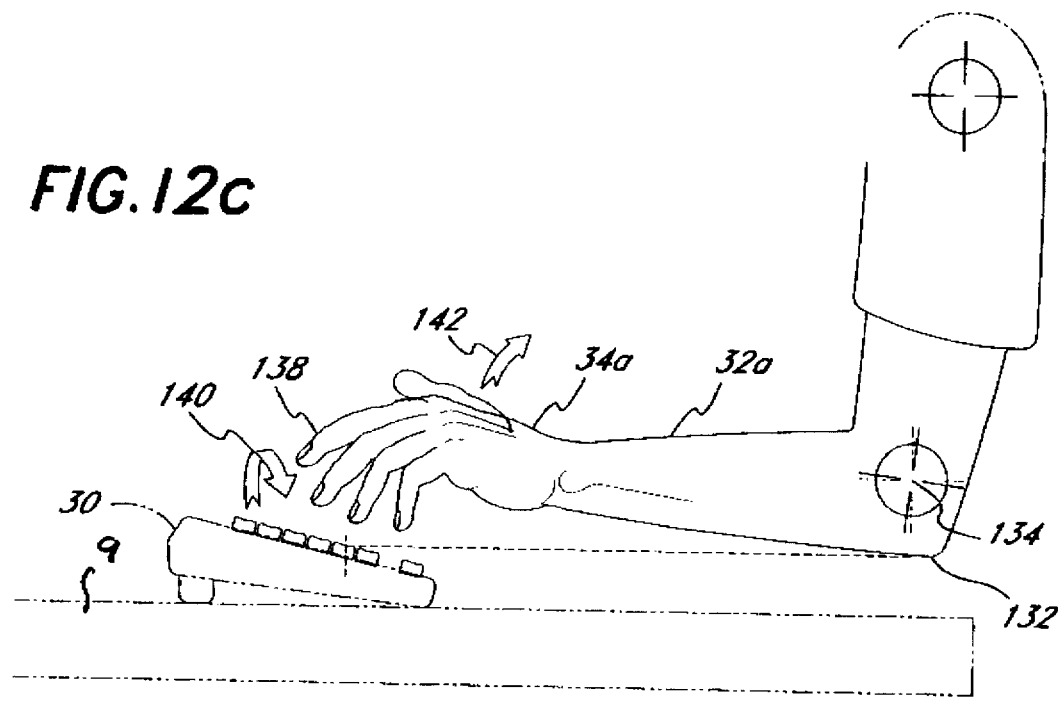

FIG. 12c shows the forearm 32a fully rotated, the inner fingers led by the index finger 138 lifted farther within its mid-range of motion, and the hand 34a rotated in the direction of arrow 140. The forearm 32a has been rotated about the elbow 132 to lift the hand 34a in the direction of arrow 142.

Figure 12D:
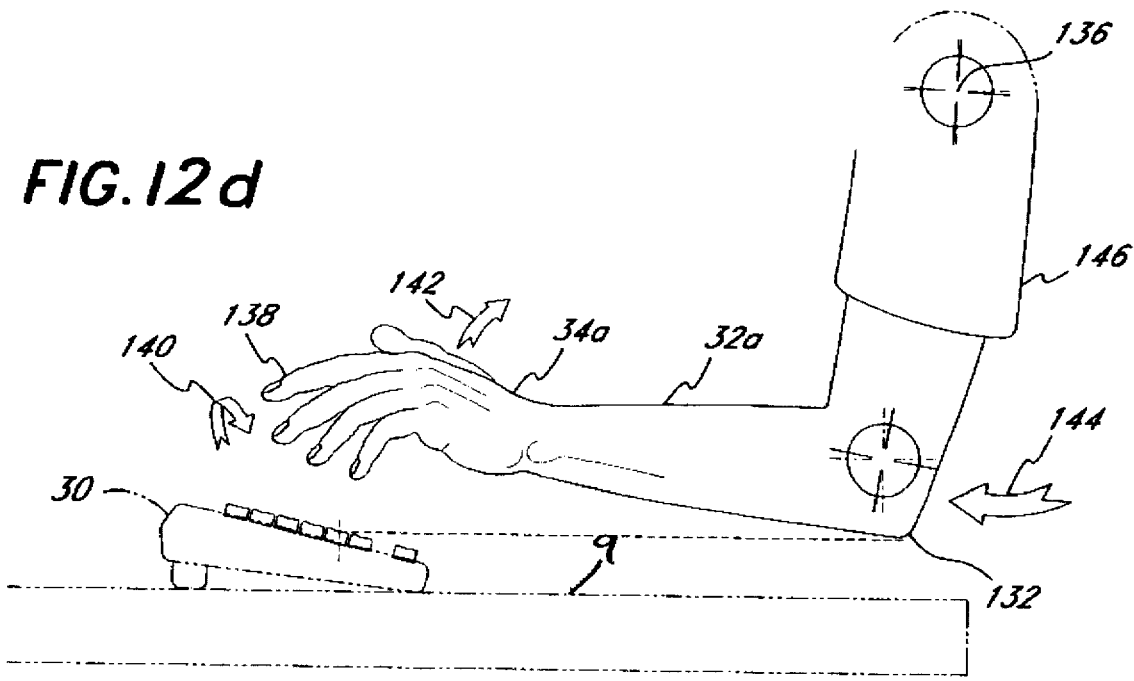

When the forearm 32a is fully lifted, as seen in FIG. 12d, the elbow 132 moves forward in the direction of arrow 144 to position the hand 34a farther forward over the keyboard. Movement of the elbow occurs by rotation of the upper arm 146 about the shoulder axis 136. Depending on the distance to be moved, the forearm 32a may continue to rotate and lift, as indicated by arrows 140 and 142, respectively, even as the elbow 132 moves forward. To effect short forward movements to the next row of keys, for example, a blend of rotational, vertical and lateral movements is used so that a clear dividing line between rotating, lifting and forward motion is impossible. Longer movements will involve more easily segmented actions.

Figure 12E:
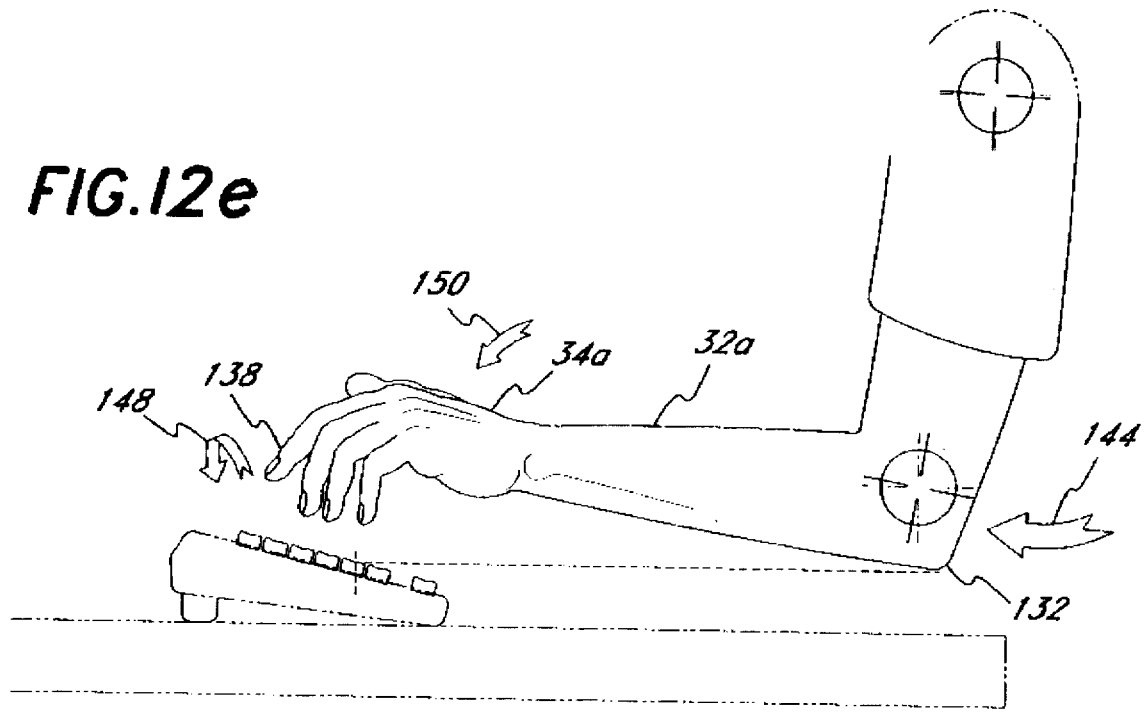

FIG. 12e depicts the hand 34a rotating in the direction of arrow 148 to lower the index finger 138, while the index finger itself drops through its mid-range of motion relative to the hand. The arrow 150 represents the forearm 32a motion. The forearm 32a drops forward in the correct technique to properly balance the actuating finger on the target key. In this respect, when moving forward on the keyboard 30, the elbow 132 may continue to move forward in the direction of arrow 144 as the forearm 32a drops. However, as discussed below, this is not true with respect to walking backward on the keyboard 30.

Figure 12F:
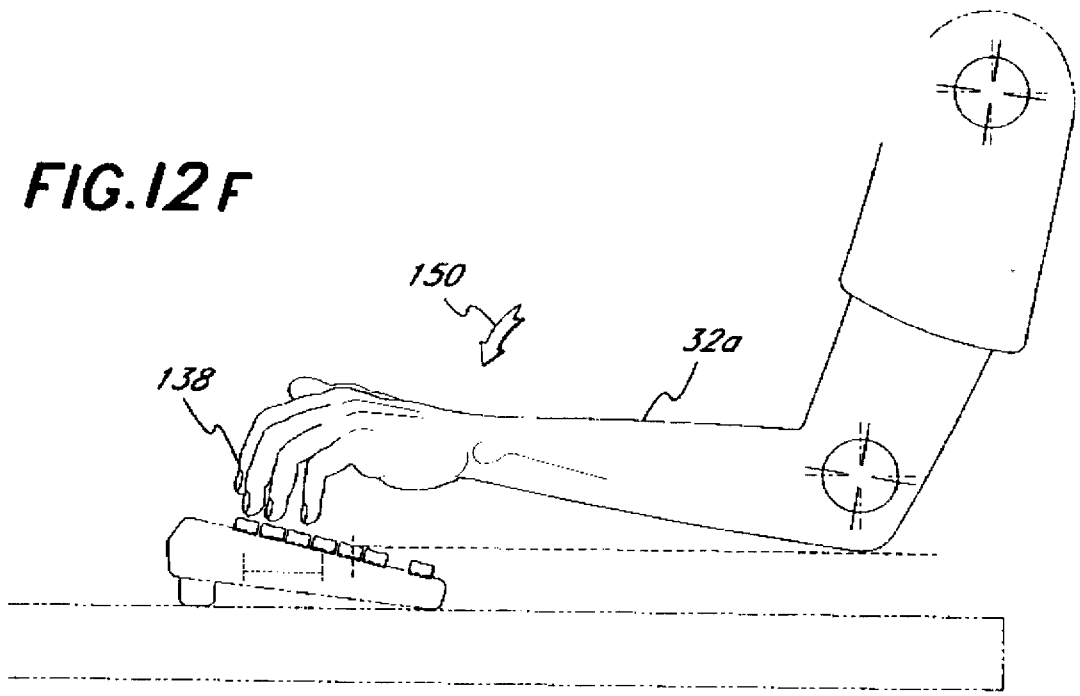

FIG. 12f shows the forearm fully lowered with the index finger 138 poised to fall on a key. The forearm 32a will continue to drop in the direction of arrow 150 to provide momentum for the finger in striking the key. In this respect, as will be more fully described below, the index finger 138 is not actively pressed into the key with respect to the hand, but instead a coordinated dropping of the forearm 32a and rotating motion of the forearm 32a propels the finger downward into the key.

It should be noted that the actuating fingers should land vertically on the key. Tilting in either direction by too great an angle will fail to provide the desired skeletal support. The rotation of the hand and lifting and dropping of the fingers must thus be precisely coordinated to terminate in the finger landing vertically downward rather than striking a glancing blow.

In contrast to the technique just described for walking forward on the keyboard 30, the elbow 132 will complete its rearward motion prior to dropping the forearm 32a when moving rearward on the keyboard. The steps of lifting and rotating of the forearm 32a prior to or during rearward movement of the forearm 32a are as described above. However, to ensure the proper forward falling of the forearm 32a, the rearward motion must end before the forearm 32a drops.

SYNTHESIZING MOVEMENTS

Figure 13:
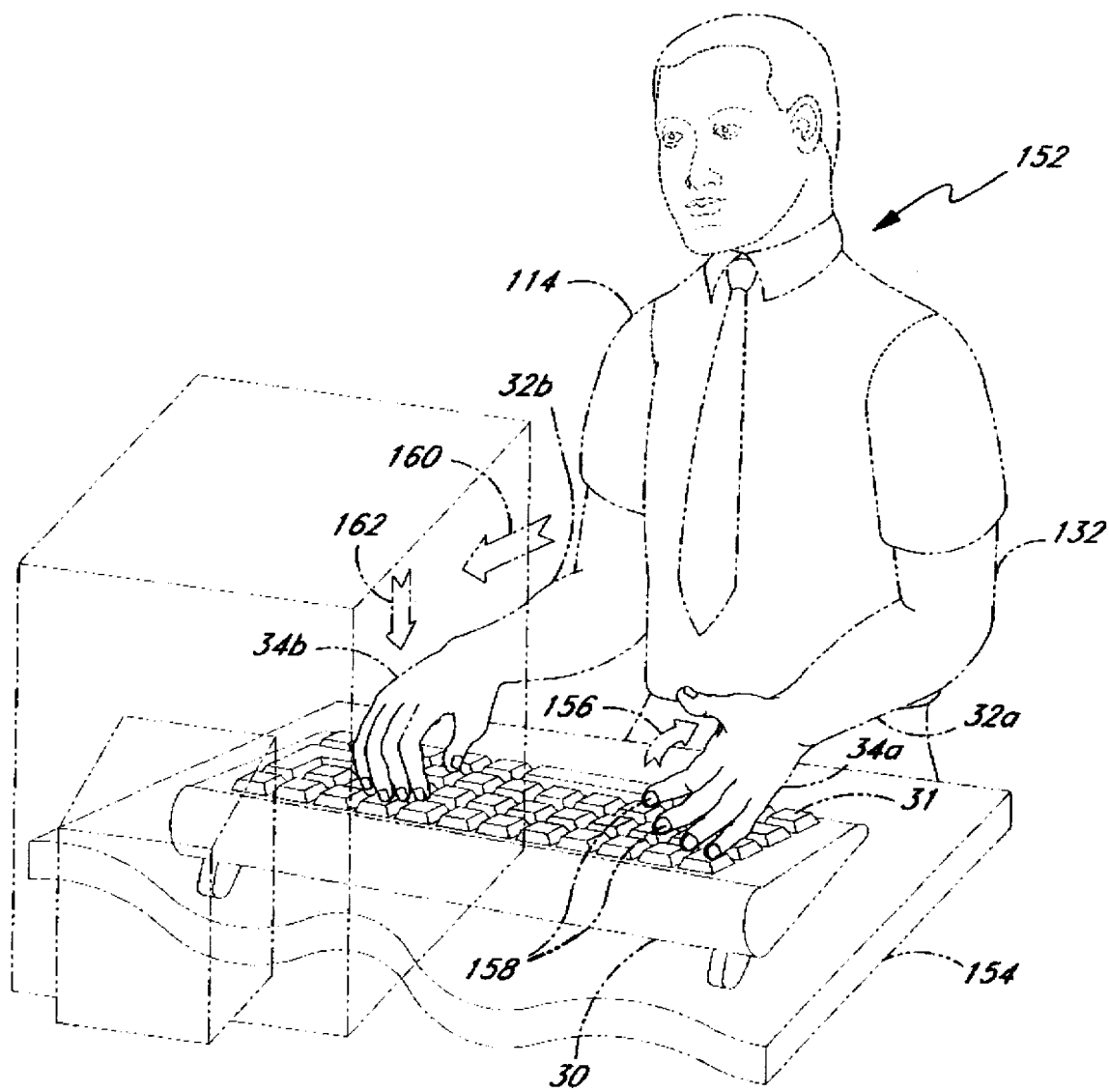
FIG. 13 is a perspective view of a keyboard typist demonstrating a combination of movements simultaneously according to the principles of the present invention.

FIG. 13 is an example of a keyboard typist 152 synthesizing several simultaneous hand and arm movements according to the present typing method. First, the height of the keyboard 30, or of the support table 154, is adjusted to place the hands 34a,b over the keys 31 with the forearms 32a,b approximately horizontal. The preferred height places the elbow 132 in horizontal alignment with the fingertips 130, as described above with reference to FIG. 12a.

The left hand 34a is shown rotating outward in pronation in the direction of arrow 156. While the hand 34a rotates by turning of the forearm 32a about its longitudinal axis, the inner fingers 158 lift in harmony. The lifting of the inner fingers 158 above the keys 31 enables a small throwing movement to adjacent keys, or a larger swinging movement to actuate out-of-the-way keys, as was described with reference to FIG. 11. Additionally, the hand 34a moves forward or backward over the keyboard, as shown in FIGS. 12a–12f. As mentioned above, all of the requisite movements stem from the proper coordinated lifting and dropping of the fingers, hands, and forearms.

While the right hand 34a is beginning a move, the left hand 34b is shown at the culmination of a forward move over the keyboard 30. The fingers had previously been lifted, and the hand 34b rotated, to allow the typist to shift the forearm 32b forward in the direction of arrow 160 by pivoting the entire arm about the shoulder 114. At the proper location, the forearm 32b drops forward as indicated by arrow 162 and rotates to drop the actuating finger toward the appropriate key. The simultaneous movement of the right and left hands 34a,b shown in FIG. 13 represents only one "snapshot" of potential moves about the keyboard. The goal of the student of the present typing method is to learn all of the proper motions and timing, and synthesizing or integrating them into a fluid, continuous typing style, with a unified finger-hand-forearm movement to insure maximum skeletal support. Any one movement alone may be accomplished by either hand while the other performs a completely different task. Eventually, with practice, the independent movements will no longer be seen as discrete actions, but rather as transitions from the last movement to the next movement.

KEYSTROKE

The keystroke comprise two elements: unification of the finger, hand and forearm movement and timing.

The typist moves the typist's fingers, hands, and forearms substantially as a unit. There is only a slight pivoting of the fingers at the finger-to-hand knuckles and is essentially no bending of the wrist. This is best illustrated in FIG. 12a through 12f. Even when the hands and forearms are rotated, the hands and forearms remain essentially aligned in the same plane.

The typist times the movements of the fingers, hands and forearms to depress a selected key. The hand is allowed to drop under the influence of gravity to move the selected key to the actuated position with optimal muscular effort upon the one finger striking the one selected key. The fingers arrive at a state of passive resting when the key bottoms out on the keybed while maintaining the one finger resting on the key and the palm of the hand substantially parallel to the flat surface 9.

As mentioned previously with reference to FIGS. 6a–c, many typists dig into the keys in a highly inefficient and potentially damaging motion. FIGS. 14a–d illustrate the proper method of hitting the keys. The keystroke technique revolves around allowing the fingers to fall onto and actuate the keys without any active downward pressing force applied. Simply put, the finger actuates the key by virtue of the falling momentum of the forearm, hand and finger. When positioned over the proper key, the forearm drops, and the typing finger drops within its mid-range of motion. The result is a coordinated drop of all elements together, with their combined mass focused on the finger actuating the key.

Figure 14C:
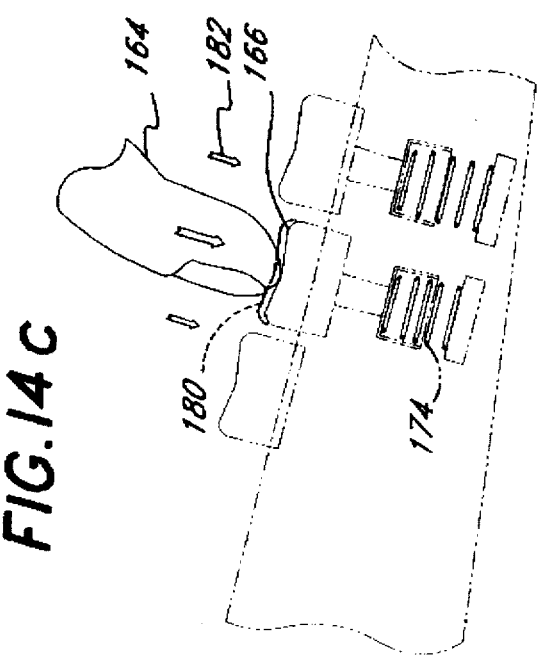
FIGS. 14a–14d are a sequence of elevational views of the correct technique for actuating a key by dropping of a finger.
Figure 14D:
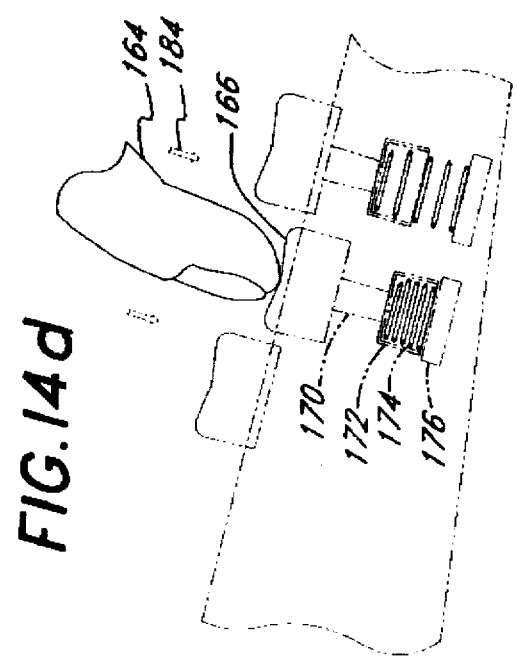
Figure 14A:
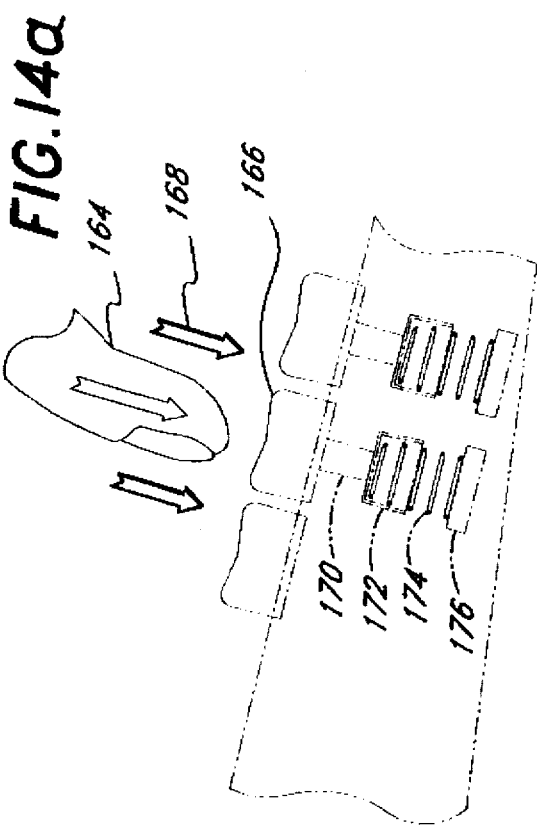

FIG. 14a illustrates a finger 164 in the process of dropping onto a key 166. The magnitude of the velocity of the finger 164 is indicated by the vector arrows 168. The key 166 includes a stem 170 terminating in a housing 172 which surrounds the upper end of return spring 174. The downward travel of the key 166 is limited by contact between the housing 172 and a keybed 176 fixed to the keyboard. This simple example is representative of the mechanical elements within a key and is only illustrative, and should not be construed as limiting.

Figure 14B:
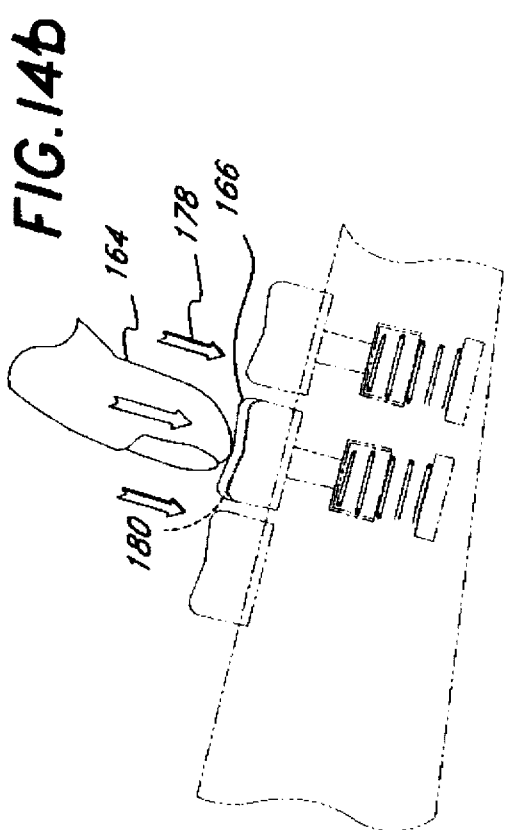

FIG. 14b shows the finger 164 at the instant of contact with the key 166. The velocity at this instant is depicted by the arrows 178, showing a slight reduction in the downward speed of the finger 164. An imaginary line 180 represents the depth at which the key 164 actuates its circuit, sending a signal to a control unit that the key has been struck. Further downward motion is unnecessary. Consequently, the correct technique is to aim the finger at the height of this imaginary line 180, rather than at the bottom of the key travel, as is commonly done. By aiming at the line 180, the typist begins to decelerate the descent of the finger 164 just prior to the point of key actuation, resulting in the slight reduction in the velocity vectors 178.

In FIG. 14c, the tip of the finger 164 has just passed the keystroke actuation line 180. The finger velocity vectors 182 are smaller still, reflecting even further deceleration. Some of the deceleration can be attributed to the increased compression of the return spring 174.

Finally, in FIG. 14d, the housing 172 contacts the keybed 176 to limit further downward motion of the key 164. At this stage, the downward velocity vectors 184 are insignificant, allowing the typist to sense the bottoming out of the key 164 with a minimum of impact. The elimination of this repeated impact reduces the overall stress experienced by the finger 164. Subsequently, the return spring 174 will apply an upward force which will assist the typist in lifting the finger 164 to perform the next typing task.

TYPING INSTRUCTIONAL METHOD

While the preceding discussion provides a basis for implementing a correct typing technique, the motions are not radically distinguishable from ordinary, harmful typing motions. Without proper instruction in the present typing technique, one is apt to fall back into old habits, thus reducing the potential therapeutic benefits. Consequently, a further aspect of the present invention is an instructional method with the goal of conditioning the typist to erase old typing patterns and substitute new improved ones.

Figure 15B:
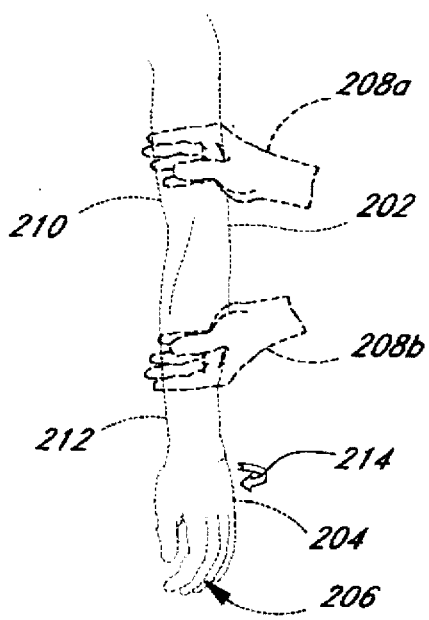

The first step in relearning how to type is shown in FIGS. 15a and 15b. The instructor must impress upon the student the importance of the proper hand position with respect to the forearm. A student 200, seen from the front, dangles his arm 202 at his side in a completely relaxed state. The hand 204 is limp, allowing the fingers 206 to assume a natural curve. This natural curve will be maintained throughout the typing technique. The fingers 26 are at their natural position in this natural curve or, more technically, the fingers are at the center of their range of motion. Exclusive movement within the mid-range of motion is more easily accomplished when the fingers 206 return to this natural position after every keystroke. An instructor's hands 208a, 208b lightly grasp the upper arm 210 and forearm 212, respectively, to help focus the student 200.

FIG. 15b illustrates the next step in the instruction method. one of the instructor's hands 208b twists the forearm 212 of the student about arrow 214 to face the back of the hand 204 forward. The instructor's other hand 208a lightly holds the upper arm 210 against rotation, although some will naturally occur by virtue of the radius and ulnar bones rotating the elbow 216.

Figure 16A:
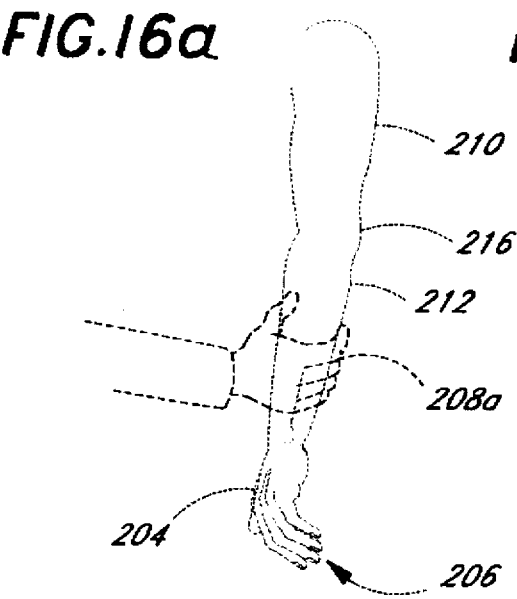
FIGS. 16a–16b are side elevational views showing the hands of an instructor manipulating a student's arm toward the correct typing position.
Figure 16B:
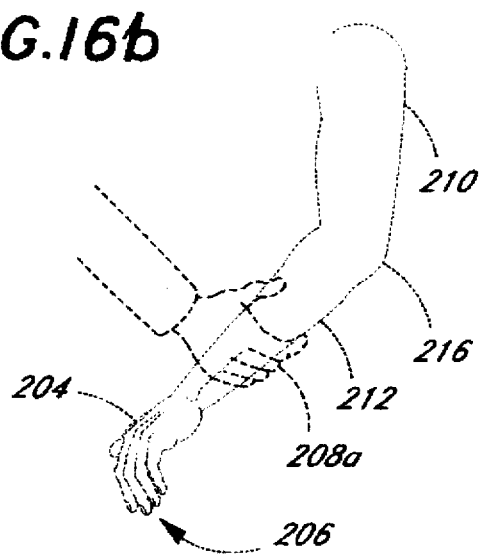

As seen from the side in FIG. 16a, the instructor's hand 208a assumes a position on the student's forearm 212. By gently lifting the forearm 212 about the elbow 216, as seen in FIG. 16b, the instructor repositions the forearm for typing. The fingers 206 may curl slightly more from gravity, but will essentially remain in the natural position established during the step shown in FIG. 15a. The instructor must emphasize the continued relaxation of the hands and fingers to ensure the proper position will be observed.

Figure 17:
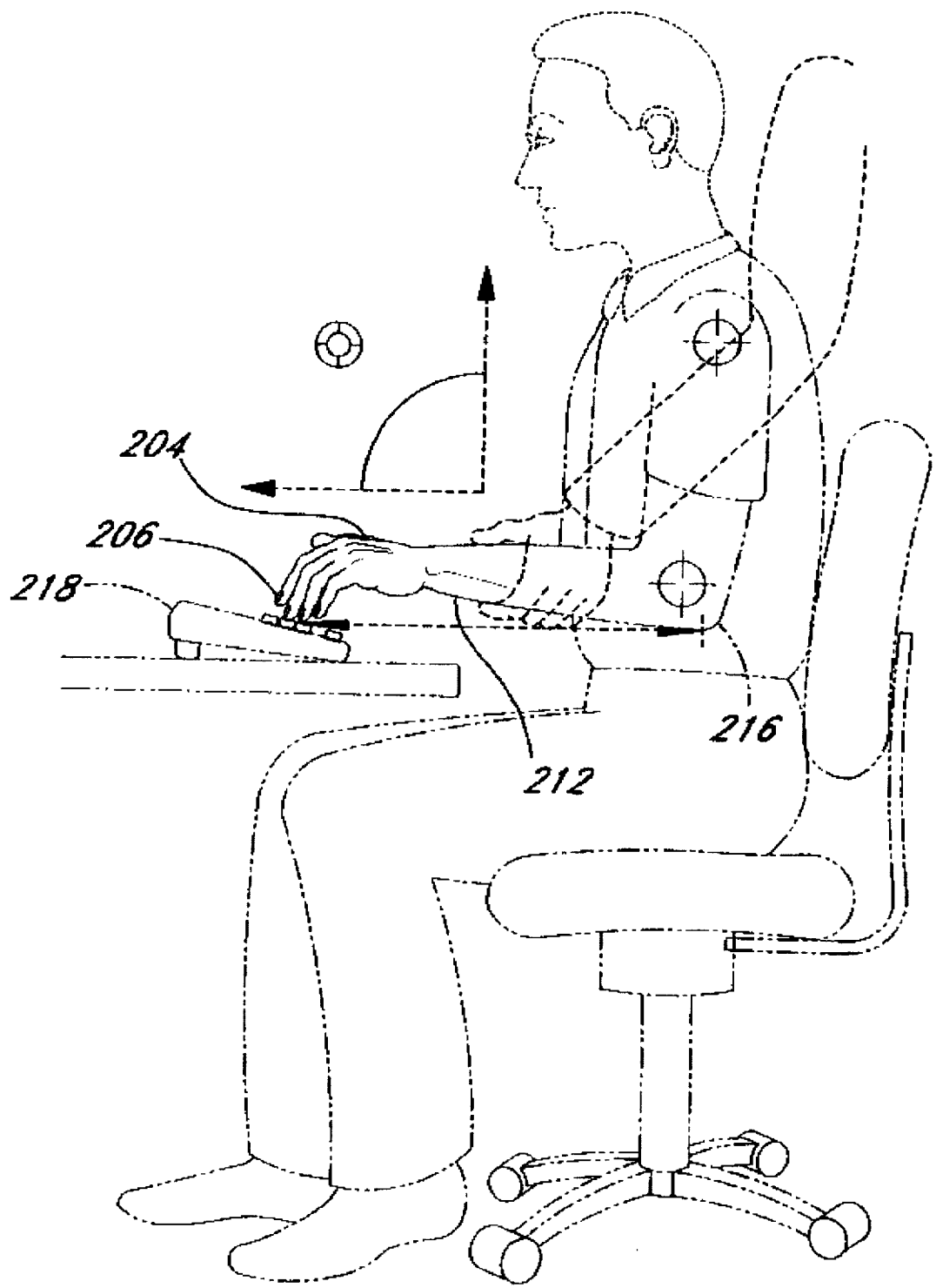
FIG. 17 is a side elevational view of a student prepared for typing with the hand of the instructor manipulating the student's arm to the correct position.

Upon lifting the forearm 212 further, the instructor places the student's hand 204 above a keyboard 218, as seen in FIG. 17. The tips of the fingers 206 rest lightly on the keys at the approximate height of the elbow 216. The fingers 206 remain in the natural curl established during the step shown in FIG. 15a. From this stable, optimally balanced position, all of the correct typing techniques can be efficiently implemented. Of course, the observance of proper posture and provision of other ergonomic comforts such as adequate back support and good lighting are presumed, and will not be discussed herein.

Figure 18C:
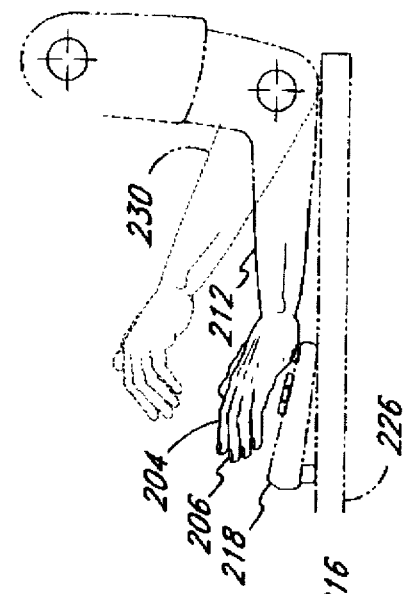
FIGS. 18a–18d are side elevational views of a student demonstrating various repetitive training exercises involving simple forward dropping of the forearm.

Prior to undertaking actual typing lessons, correct balance and timing are taught to the student. FIG. 18a illustrates a student 200 sitting in a chair 220 practicing dropping the forearm 212 onto the leg 222. The hand 204 is shown in the relaxed, natural position previously established. The forearm 212 pivots about the elbow 216 and raises to the position 224 shown in phantom. The student 200 allows the forearm 212 to drop by gravity only and is instructed to totally relax the muscles in the arm. This exercise is repeated until the student is comfortable with the proper free fall arm drop.

Figure 18B:
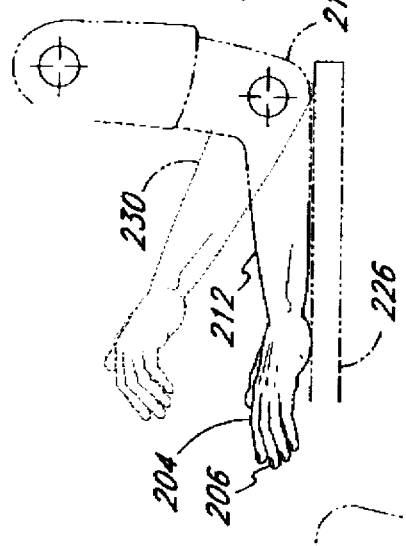

The next stage, shown in FIG. 18b, is to support the forearm 212 on a table 226 and practice raising and dropping the arm by rotation about the elbow 216 so that the palm 228 of the hand 204 lands squarely on the table. Again, the student is instructed to allow the forearm 212 and hand 204 to drop only under the influence of gravity. The fingers 206 will be curled naturally in the upper position 230, but may straighten out upon impact with the table 226. This table drop is repeated until the student masters the free fall concept with the supported elbow 216.

FIG. 18c illustrates the forearm 212 raising and dropping from the table 226 by rotation about the elbow 216 so that the palm 228 of the hand 204 lands squarely on the keyboard 218. The table 226 supports the elbow 216. The student drops the forearm 212 and hand 204 only under the influence of gravity. The fingers 206 will be curled naturally in the upper position 230, but may straighten out upon impact with the keyboard 218. This table drop is repeated many times, conditioning the student to dropping the arm to the proper keyboard height.

Ultimately, after the previous dropping steps have been mastered, the student practices dropping all of the fingers onto the keyboard at once. The instructor will emphasize that it is unnecessary to prepare either the hand or finger while poised in the air, but rather the hand and finger should be free of undue tension before dropping on the keyboard.

Figure 18D:
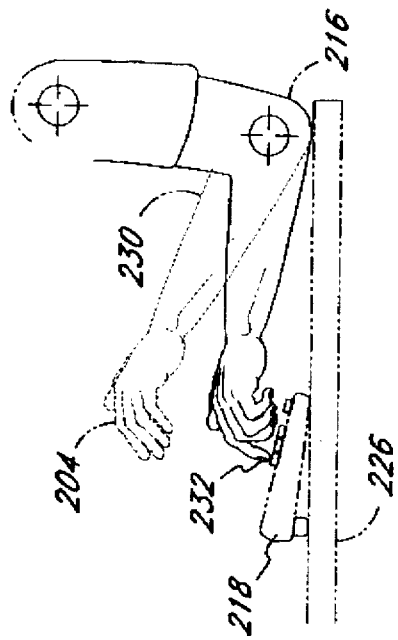
Figure 18A:
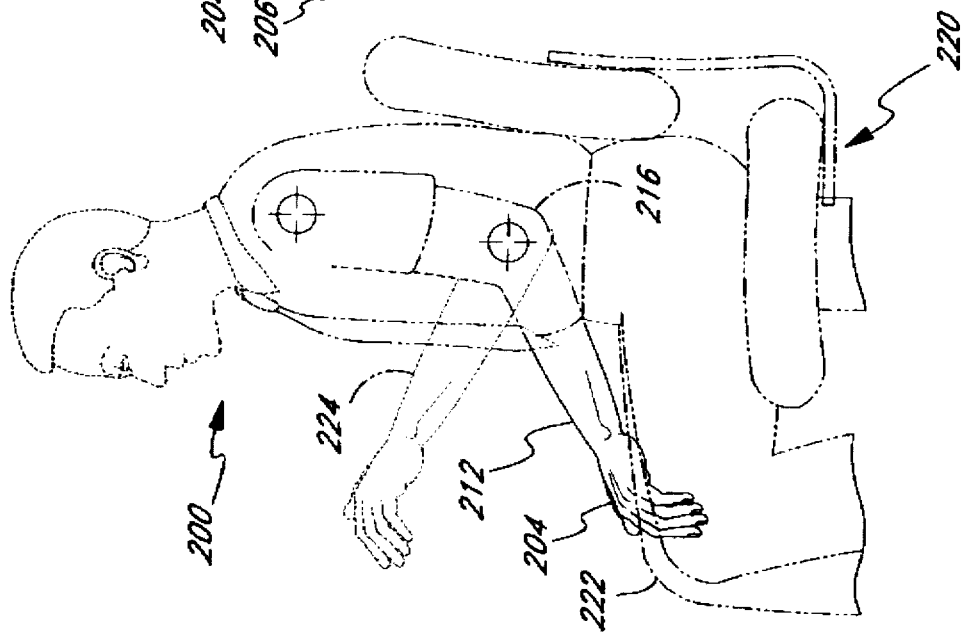

The student then practices dropping one finger 232 at a time on the keyboard 218, as seen in FIG. 18d. Once again, the table 226 supports the elbow 216. The forearm 212 lifts to the upper position 230 by rotation about the elbow 216 with the hand 204 in the natural curve previously established. The student is asked to drop on the third finger of the dominant hand; first on any consecutive row of keys laterally, and then on any column of keys longitudinally. The student then must demonstrate correct walking up and down with the correct alignment using all the other fingers and thumb.

The forearm drop is now modified to incorporate the proper keystroke timing described above with reference to FIGS. 14a–d. That is, the student aims the finger to the imaginary height of key actuation 180, slightly below the top of the reset key. The proper timing requires much conditioning to learn and thus the student must thoroughly practice this aspect until he or she moves on to the next or intermediate phase.

After the proper timing is learned, the student is ready to actually do some typing. The views of FIG. 17 and 18d taken together illustrate the position and movement of the student 200 during this intermediate phase. Namely, the student 200 assumes the correct sitting position at the keyboard and practices repetitive finger drops on all the keys. For simplicity, the student 200 begins with only one hand.

First, the finger lift techniques described above with reference to FIGS. 9 and 10 will be practiced. Once these are mastered, the student 200 moves from key to key along the entire keyboard 218 utilizing the swinging and walking techniques described above with reference to FIGS. 11 and 12. Finally, both hands practice the entire spectrum of motions, as depicted in FIG. 13. Each training session typically starts with the basic motions of alignment and dropping before practicing the intermediate motions of independent finger dropping and timing, and finally graduating to advanced typing skills synthesizing all of the elements described herein.

TECHNIQUE OF USING A MOUSE AND INSTRUCTIONAL METHOD

Many of the therapeutic benefits of the previously described typing method are applicable to reduce hand injuries sustained while using a computer mouse. FIGS. 19a–d illustrate several bad hand positions which may cause stress injury. FIG. 19a shows the hand 240 resting on the mouse 242 with one finger 244 extended forward in a reaching stance. The reaching of the finger 244 may eventually create fatigue, irritation or muscle and tendon strain. FIG. 19b shows the hand 240 angled upward from the longitudinal axis 246 of the forearm 248. The dropped wrist 250 may lead to muscle and tendon strain as well. In FIG. 19c, the fingers 252 are extended too far in front of the mouse 242 so that they are over-curled. Again, this position, especially if combined with a dropped wrist, may cause injury over extended periods. Finally, ulnar deviation is seen in FIG. 19d. In this position, the hand 240 angles outward with respect to the forearm 248. Most people are unaware there is a proper way to handle a mouse to reduce the chance of injury, as the subject has rarely if ever been addressed.

FIGS. 20a–d illustrate the proper method of handling a mouse 242 to reduce the chance of repetitive stress injury. The technique revolves around assuming a natural hand position and keeping the motions of the fingers within their mid-range of movement, similar to the typing method discussed above.

FIG. 20a shows a hand 240 in proper alignment with the forearm 254. The fingers 252 drape naturally over the actuation buttons 256 of the mouse 242 without overcurling. FIGS. 20b and 20c show the proper ulnar alignment whereby the hand 240 extends along the line of the forearm

254. FIG. 20d illustrates the correct mouse handling position for people with large hands 258. Here, the hand 258 is angled with respect to the long dimension of the mouse 242 so that the thumb 260 actuates one mouse button 256a, while the index finger 262 actuates the other button 256b. However, despite the modified grip, the hand and fingers maintain the relaxed, natural orientation as previously discussed.

Different students may require different levels of instruction based on their proficiency and level of exposure to the risk of chronic stress injury. Those who spend more than 6 hours a day on fairly consistent tasks at a workstation are considered a high risk group and may require 15–20 hours of comprehensive instruction to first introduce and then perfect the present method for speed and accuracy. Others who type somewhat less during the day fall into a medium risk group which benefits most from about 7–10 hours of modified instruction intended to create an awareness of and basic skills for injury prevention. Still another group whose members type intermittently throughout the day are at a low risk of injury and would most benefit from about 4–6 hours of instruction with the goal of conveying the basic principles of the correct typing technique.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A method by which a typist actuates individual keys of an alpha-numeric keyboard in a manner to avoid or minimize repetitive stress injury to the typist, said alpha-numeric keyboard including a plurality of rows of keys, including a home row of keys, with said keys moving upon manual actuation by said typist between a normally raised position off a key bed to an actuated position between the key bed and the normally raised position, said method comprising (a) said typist initially assuming an at rest position by sitting upright before the keyboard and positioning the typist's forearms in a balanced position with the forearms resting down so that the bottom of the elbows are near the sides of the typist at about the same level as the home row of keys, with the typist's hands and wrists in a natural profile corresponding to said hands and wrists being as if at rest by the typist's side but instead positioned in front of the keyboard, with the palms of the hands facing downward and the fingers of the hands resting lightly on the keys in a generally vertically orientation, and (b) said typist striking selected, individual keys using coordinated finger, hand, wrist and arm movements approximately in the mid-range of joint articulation, including, as required to strike a selected key (i) lifting the forearm vertically by pivoting said forearm at the elbow and laterally moving said forearm across the keyboard to position one finger adjacent one selected key and then lowering the forearm while simultaneously striking said selected key with said one finger, (ii) lifting the forearm vertically and rotating the typist's upper arm at the typist's shoulder which is maintained in a stable position to swing said forearm laterally across the keyboard to position one finger adjacent one selected key and then lowering the forearm while simultaneously striking said one selected key with said one finger, (iii) without curling the fingers, but elevating the fingers above the keyboard and lifting and moving the forearm into and away from the keyboard to position one finger adjacent one selected key and then lowering the forearm while simultaneously striking said one selected key with said one finger, and (c) said typist moving the typist's fingers, hands, and forearms substantially as a unit, with only slight pivoting of the finger at the finger-to-hand knuckle, and essentially no bending of the wrist, and timing said movements of step (b) to depress said one selected key, allowing the hand to drop under the influence of gravity to move said one selected key to the actuated position with optimal muscular effort upon said one finger striking said one selected key, said one finger arriving at a state of passive resting when the key bottoms out on the key bed while maintaining said one finger in a generally vertically orientation.

2. The method of claim 1 including coordinated finger movement to attain typing speeds in excess of 60 words per minute comprising lifting the hand and forearm and, while in the air, the lifting the finger at the finger-to-hand knuckle and simultaneously rotating the forearm around a longitudinal axis extending lengthwise through the forearm and middle finger of the hand to position one finger adjacent one selected key and striking said selected key with said finger.

3. A method whereby an instructor teaches a student to actuate individual keys of an alpha-numeric keyboard in a manner to avoid or minimize repetitive stress injury to the student, with said keyboard resting on a flat surface above ground level to enable the student to manipulate the keys while in a seated position, said keys moving upon manual actuation by said student between a normally raised position off a key bed to an actuated position between the key bed and the normally raised position, said method including the following exercises:

(a) with the student in the standing position and being prompted by the instructor, the student placing the student's arms at rest at the student's sides noting the profile curvature and position of the fingers, hands, wrists, and arms while at rest, (b) with the student in the seated position and being prompted by the instructor, the student placing the student's hands and arms onto the student's legs, maintaining the at rest profile curvature and position of the fingers, hands, and wrists with the palms of the hands facing downward and the elbows of the student being relaxed, (c) with the student maintaining relaxed shoulders and upper arms, yet providing muscular support for the wrist and forearm, and being prompted by the instructor, striking the keys with a plurality of fingers, said fingers passively resting on the keys in a balanced forward posture after striking the keys, with the keys depressed to bottom out on the key bed, (d) with the student maintaining relaxed shoulders and upper arms, yet providing muscular support for the wrist and forearm, and and being prompted by the instructor, the student allowing the forearm to fall forward and come to rest with an individual finger striking one selected key, with said one finger resting on said key, with the finger bent at the finger-to-hand knuckle and the palm of the hand substantially parallel to the flat surface, (e) with the student's elbow being unsupported and resting at the side of the student's torso, the student repeatedly allowing the forearm to fall forward and come to rest with the fingers resting on the keys, with the fingers bent at the finger-to-hand knuckle and the palm of the hand substantially parallel to the flat surface, until the student experiences balancing the forearm forward, (f) repeating step (e) using each individual finger to strike only one key while using correct hand and arm alignment developed in steps (a) and (b), (g) the student placing a finger on a key and riding said key with the finger thereon as said key moves from the normally raised position off the key bed through the actuated position, then onto the key bed, and then returning to the normally raised position.

4. The method of claim 3 where, prior to step (c), with the student resting the student's elbow on the flat surface, the student allowing the forearm to fall forward and come to rest with the fingers resting on the keys, with the finger bent at the finger-to-hand knuckle and the palm of the hand substantially parallel to the flat surface.

5. The method of claim 3 where, prior to step (c), with the student in the seated position and being prompted by the instructor, the student repeatedly elevating the hands above the keyboard and dropping the hands onto the keyboard, pivoting the forearms at the elbows so that fingers touch the keys without significantly depressing the keys.

6. The method of claim 3 where, prior to step (c), with the student maintaining relaxed shoulders and upper arms, yet providing support for the forearm, the instructor holding the hands of the student, one hand at a time, placing the instructor's hand on the student's hand and engaging the keys to simulate passive resting of the fingers on the keys, with the keys depressed to bottom out on the key bed, 7. The method of claim 3 where, prior to step (c), with the student in the seated position and the student's elbow resting on the flat surface, the student repeatedly elevates the hands above the keyboard and drops the hands onto the keyboard, pivoting the forearms at the elbows so that butt of the palms of the hands strike and depress the keys.

8. The method of claim 3 where, prior to step (c), with the student in the seated position and the student's elbow resting on the flat surface, the student repeatedly elevates the hands above the flat surface and drops the hands onto the flat surface, pivoting the forearms at the elbows so that butt of the palms of the hands strike the fat surface.

9. The method of claim 3 where the student repeats said exercises until attaining the ability to strike selected, individual keys using coordinated finger, hand, wrist and arm movements approximately in the mid-range of joint articulation, said student demonstrating proficiency in the following key stroke movements:

(i) lifting the forearm vertically by pivoting said forearm at the elbow and laterally moving said forearm across the keyboard to position one finger adjacent one selected key and then lowering the forearm while simultaneously striking said selected key with said one finger, (ii) lifting the forearm vertically and rotating the typist's upper arm at the typist's shoulder which is maintained in a stable position to swing said forearm laterally across the keyboard to position one finger adjacent one selected key and then lowering the forearm while simultaneously striking said one selected key with said one finger, (iii) without curling the fingers, but elevating the fingers above the keyboard and lifting and moving the forearm into and away from the keyboard to position one finger adjacent one selected key and then lowering the forearm while simultaneously striking said one selected key with said one finger.

10. The method of claim 9 where the student, after mastering the exercises, practices the key stroke movements, timing said key stroke movements to depress said one selected key, allowing the hand to drop under the influence of gravity to move said one selected key to the actuated position with optimal muscular effort upon said one finger striking said one selected key, said one finger arriving at a state of passive resting when the key bottoms out on the key bed while maintaining said one finger in a generally vertically orientation, maintaining the fingers, hands, and forearms substantially as a unit, with only slight pivoting of the finger at the finger-to-hand knuckle and essentially no bending of the wrist.

11. The method of claim 10 including practicing coordinated finger movement to attain typing speeds in excess of 60 words per minute by lifting the hand and forearm and, while in the air, the lifting the finger at the finger-to-hand knuckle and simultaneously rotating the forearm around a longitudinal axis extending lengthwise through the forearm and middle finger of the hand to position one finger adjacent one selected key and striking said selected key with said finger.

12. A method by which a typist manipulates a mouse in a manner to avoid or minimize repetitive stress injury to the typist, said mouse including an actuation button providing an audible sound when depressed and a palm support at a rear section of the mouse, said actuation button being along a forward section of the mouse and said mouse resting on a flat surface, said method comprising (a) said typist with one of the typist's hand and wrist in a natural profile corresponding to said hand and wrist being as if at rest by the typist's side but instead positioned over the mouse, with the palm of the hand facing downward and the fingers of the hands extending over and engaging the forward section of the mouse, including the actuation button, and the butt of the palm resting on the rear section, and (b) said typist elevating the forearm and elbow above the flat surface and moving the forearm laterally, but not bending the wrist, to move the mouse across the flat surface while avoiding gripping the mouse with the fingers of the typist's hand and allowing the weight of the typist's forearm to rest down on the mouse, and (c) actuating the actuation button using the underside portion of the finger engaging the actuation button to depress the actuation button only to the point of the audible sound.

13. The method of claim 12 where a portion of the palm rests on the flat surface.

14. The method of claim 13 where the hand has a longitudinal axis extending along the middle finger through the hand and the mouse is at a substantially diagonal orientation with respect to the longitudinal axis of the hand.

15. A method whereby an instructor teaches a student to manipulate a mouse in a manner to avoid or minimize repetitive stress injury to the student, said mouse including an actuation button providing an audible sound when depressed and a palm support at a rear section of the mouse, said actuation button being along a forward section of the mouse and said mouse resting on a flat surface, said method comprising said method including the following exercises:

(a) with the student in the standing position and being prompted by the instructor, the student placing the student's arms at rest at the student's sides noting the natural profile curvature and position of the fingers, hands, wrists, and arms while at rest, (b) with the student in the seated position and being prompted by the instructor, the student placing the student's hands and arms onto the student's legs, maintaining the at rest profile curvature and position of the fingers, hands, and wrists with the palms of the hands facing downward and the elbows of the student being relaxed, (c) with the student maintaining relaxed shoulders and upper arms, yet providing muscular support for the wrist and forearm, and being prompted by the instructor, dropping the hand and forearm onto the mouse to cover the mouse with the palm of the hand facing downward and the fingers of the hands extending over and engaging the forward section of the mouse, including the actuation button, and the butt of the palm resting on the rear section, maintaining said natural profile curvature and position of the fingers, hands, wrists, and arms, (d) said student, with prompting by the instructor, elevating the forearm and elbow above the flat surface and moving the forearm laterally, but not bending the wrist, to move the mouse across the flat surface while avoiding gripping the mouse with the fingers of the student's hand and allowing the weight of the typist's forearm to rest down on the mouse, and (e) said student, with prompting by the instructor, actuating the actuation button using the underside portion of the finger engaging the actuation button to depress the actuation button only to the point of the audible sound.

16. The method of claim 15 where the student has a large hand, the instructor prompts the student to place the student's hand on edge so that the edge of the palm rests on the flat surface and is generally perpendicular to the flat surface with the mouse generally parallel to the palm, and then the student allows the hand to fall onto the mouse with the a portion of the palm resting on the flat surface.

17. The method of claim 15 where the student has a large hand with a longitudinal axis extending along the middle finger through the hand and the instructor prompts the student to place the mouse at a substantially diagonal orientation with respect to the longitudinal axis of the hand.

18. A method by which a typist actuates individual keys of an alpha-numeric keyboard in a manner to avoid or minimize repetitive stress injury to the typist, comprising (a) said typist initially assuming an at rest position by sitting upright before the keyboard and positioning the typist's forearms in a balanced position with the typist's hands and wrists in a natural profile and the fingers of the hands resting lightly on the keys in a generally vertically orientation, and (b) said typist striking selected, individual keys using coordinated finger, hand, wrist and arm movements approximately in the mid-range of joint articulation, including, as required to strike one selected key, and (c) said typist moving the typist's fingers, hands, and forearms substantially as a unit, with only slight pivoting of an individual finger at the finger-to-hand knuckle, and essentially no bending of the wrist, and timing said movements of step (b) to depress said one selected key, allowing the hand to drop under the influence of gravity to move said one selected key to an actuated position with optimal muscular effort upon said one finger striking said one selected key, said one finger arriving at a state of passive resting on the key in a generally vertically orientation.

19. The method of claim 18 where the coordinated finger, hand, wrist and arm movements include (i) lifting the forearm vertically by pivoting said forearm at the elbow and laterally moving said forearm across the keyboard to position one finger adjacent one selected key and then lowering the forearm while simultaneously striking said selected key with said one finger, (ii) lifting the forearm vertically and rotating the typist's upper arm at the typist's shoulder which is maintained in a stable position to swing said forearm laterally across the keyboard to position one finger adjacent one selected key and then lowering the forearm while simultaneously striking said one selected key with said one finger, (iii) without curling the fingers, but elevating the fingers above the keyboard and lifting and moving the forearm into and away from the keyboard to position one finger adjacent one selected key and then lowering the forearm while simultaneously striking said one selected key with said one finger.

20. The method of claim 19 including coordinated finger movement to attain typing speeds in excess of 60 words per minute comprising lifting the hand and forearm and, while in the air, the lifting the finger at the finger-to-hand knuckle and simultaneously rotating the forearm around a longitudinal axis extending lengthwise through the forearm and middle finger of the hand to position one finger adjacent one selected key and striking said selected key with said finger.

\* \* \* \* \*